(12) United States Patent
Yerramalli et al.

(10) Patent No.: US 9,510,222 B2
(45) Date of Patent: Nov. 29, 2016

(54) DETECTION OF BURSTY WIFI INTERFERENCE IN LTE/LTE-A COMMUNICATIONS IN AN UNLICENSED SPECTRUM

(71) Applicant: QUALCOMM Incorporated, San Diego, CA (US)

(72) Inventors: Srinivas Yerramalli, San Diego, CA (US); Tao Luo, San Diego, CA (US); Naga Bhushan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/465,560

(22) Filed: Aug. 21, 2014

(65) Prior Publication Data

US 2015/0056931 A1 Feb. 26, 2015

Related U.S. Application Data

(60) Provisional application No. 61/869,157, filed on Aug. 23, 2013.

(51) Int. Cl.
*H04W 24/08* (2009.01)
*H04W 16/14* (2009.01)
(Continued)

(52) U.S. Cl.
CPC .............. *H04W 24/08* (2013.01); *H04B 17/00* (2013.01); *H04B 17/345* (2015.01); *H04W 16/14* (2013.01); *H04W 72/1215* (2013.01); *H04W 88/06* (2013.01)

(58) Field of Classification Search
CPC ... H04B 17/00; H04B 17/345; H04W 16/14; H04W 24/08; H04W 72/1215; H04W 88/06
USPC ...... 455/63.13, 501, 436, 41.2, 500, 13.1, 9, 455/11.1, 464, 115.1, 135, 267, 226.3; 370/252, 278, 336, 329
See application file for complete search history.

(56) References Cited

U.S. PATENT DOCUMENTS

| 2008/0221951 A1* | 9/2008 | Stanforth | G06Q 10/063 705/7.41 |
|---|---|---|---|
| 2010/0085161 A1* | 4/2010 | Nishikawa | G06K 7/0008 340/10.3 |

(Continued)

FOREIGN PATENT DOCUMENTS

| KR | WO 2013051836 A1 * | 4/2013 | ............ H04W 24/10 |
|---|---|---|---|
| WO | WO 2012/139278 A1 * | 10/2012 | ............ H04W 48/18 |
| WO | WO-2012139278 A1 | 10/2012 | |

OTHER PUBLICATIONS

ISA/EPO, International Search Report and Written Opinion of the International Searching Authority, Int'l. App. No. PCT/US2014/052305, Apr. 10, 2015, European Patent Office, Rijswijk, NL, 9 pgs.

*Primary Examiner* — Tan H Trinh
(74) *Attorney, Agent, or Firm* — Holland & Hart LLP

(57) ABSTRACT

Methods, systems, and devices are described for detection of one or more interfering signals in a particular frequency spectrum. Signal characteristics may be identified for a signal of interest in the spectrum, such as a signal that is desired to be received at a wireless communications device. Based at least in part on the characteristics, one or more interference detection opportunities may be identified, during which interfering signals in the spectrum may be detected. Interference detection opportunities may include, for example, periods when the signal of interest may be absent from the particular frequency spectrum. Transmissions in the frequency spectrum may be monitored during the interference detection opportunity to determine the presence of one or more interfering signals.

30 Claims, 15 Drawing Sheets

(51) Int. Cl.
*H04W 72/12* (2009.01)
*H04B 17/00* (2015.01)
*H04B 17/345* (2015.01)
*H04W 88/06* (2009.01)

(56) References Cited

U.S. PATENT DOCUMENTS

| | | | | |
|---|---|---|---|---|
| 2012/0147274 A1* | 6/2012 | Hassan | ................ | H04L 1/0033 348/729 |
| 2012/0207040 A1* | 8/2012 | Comsa | .............. | H04W 72/1215 370/252 |
| 2012/0230263 A1* | 9/2012 | Nam | ................... | H04W 72/082 370/329 |
| 2013/0176877 A1* | 7/2013 | Sadek | .................. | H04W 24/02 370/252 |
| 2013/0201884 A1* | 8/2013 | Freda | ................ | H04W 72/005 370/278 |
| 2014/0071904 A1* | 3/2014 | Koo | ................... | H04W 52/243 370/329 |
| 2014/0220963 A1* | 8/2014 | Jung | .................... | H04W 48/16 455/422.1 |
| 2014/0233412 A1* | 8/2014 | Mishra | ................. | H04L 47/762 370/252 |
| 2014/0314056 A1* | 10/2014 | Park | ..................... | H04B 7/2643 370/336 |
| 2014/0328313 A1* | 11/2014 | Merlin | ................ | H04B 7/2621 370/330 |
| 2014/0341407 A1* | 11/2014 | Fischer | ................ | H04R 25/552 381/315 |
| 2015/0049712 A1* | 2/2015 | Chen | ................. | H04W 72/1215 370/329 |
| 2015/0049715 A1* | 2/2015 | Yerramalli | ............ | H04L 5/1469 370/329 |
| 2015/0049741 A1* | 2/2015 | Chen | .................... | H04W 48/12 370/336 |
| 2015/0195844 A1* | 7/2015 | Yang | ........................ | H04L 1/00 455/452.2 |
| 2016/0029430 A1* | 1/2016 | Mishra | ................. | H04W 36/30 370/254 |
| 2016/0080955 A1* | 3/2016 | Carbajal | ................ | H04W 24/08 455/67.11 |
| 2016/0119924 A1* | 4/2016 | Lindoff | ................ | H04W 16/14 370/338 |

* cited by examiner

DETECTION OF BURSTY WIFI INTERFERENCE IN LTE/LTE-A COMMUNICATIONS IN AN UNLICENSED SPECTRUM

CROSS REFERENCES

The present Application for Patent claims priority to U.S. Provisional Patent Application No. 61/869,157 by Yerramalli et al., entitled "Detection of Bursty Wifi Interference in LTE-U," filed Aug. 23, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WiFi networks generally operate in an unlicensed spectrum. However, access to unlicensed spectrum may need coordination to ensure that access points of the same or different operator deployments, using the same or different techniques for accessing the unlicensed spectrum, can co-exist and make effective use of the unlicensed spectrum.

SUMMARY

The described features generally relate to one or more improved systems, methods, and/or devices for wireless communications, and more particularly, to detection of one or more interfering signals in a particular frequency spectrum. Signal characteristics may be identified for a signal of interest in the spectrum, such as a signal that is desired to be received at a wireless communications device. Based at least in part on the characteristics one or more interference detection opportunities may be identified, during which interfering signals in the spectrum may be detected. Interference detection opportunities may include, for example, periods when the signal of interest may be absent from the particular frequency spectrum. Transmissions in the frequency spectrum may be monitored during the interference detection opportunity to determine the presence of one or more interfering signals.

In some aspects, different transmission characteristics for wireless signal transmissions in a particular frequency spectrum may be identified for an interfering signal and a signal of interest. The interfering signal may be, for example, signals commonly transmitted using the particular frequency spectrum (e.g., WiFi signals), and the signal of interest may be a signal (e.g., one or more LTE/LTE-A signals in an unlicensed or shared spectrum) transmitted and received by a particular wireless device. Signals may be received on one or more carrier frequencies in the frequency spectrum, and a second order periodicity of one or more signals modulated onto each of the received carrier frequencies may be determined. The presence of one or more interfering signals may be detected based on the second order periodicity of the one or more signals modulated onto each of the received carrier frequencies and based on the transmission characteristics of the wireless signal transmission and interfering signal transmission. For example, expected interfering signals may have a known second order periodicity that is different than the second order periodicity of the signal of interest.

In a first set of illustrative examples, a method for wireless communication is provided. The method generally includes identifying characteristics for wireless signal transmissions in an unlicensed spectrum. The method may further include identifying, based at least in part on the characteristics, at least one interference detection opportunity in which interfering signals in the unlicensed spectrum may be detected. The unlicensed spectrum may be monitored for transmissions during the interference detection opportunity, and the method may determine presence of interfering signals responsive to the monitoring. In some examples, the method may further comprise mitigating interference based in part on the determination of interference.

In some examples, the interference detection opportunity may include, for example, one or more of a time period or frequency band identified as having an absence of Long Term Evolution-Unlicensed (LTE) signal transmissions in an unlicensed or shared spectrum. An interference detection opportunity may include, according to some examples, one or more of a signaling period adjacent to an LTE/LTE-A signal in an unlicensed or shared spectrum transmission period, a frequency band adjacent to an LTE/LTE-A signal in an unlicensed or shared spectrum signal transmission frequency band, and/or a reserved null tone during an LTE signal transmission in the unlicensed spectrum. Reserved null tones may include, for example, reserved empty resource blocks (RBs) within the LTE signal transmission and/or one or more resource blocks at an edge of a frequency band of the LTE signal transmission in an unlicensed spectrum. Additionally or alternatively, the method may further comprise reserving one or more null RBs at the edge of the frequency band to augment energy detection. The one or more reserved null RBs at the end of the frequency band of each carrier may further be transmitted to a UE or another base stations. In some examples, a location of the null tones may be signaled through one or more of radio resource control (RRC) signaling, system information block (SIB) signaling, media access control (MAC) control elements or a downlink grant readable by at least one user equipment. In some examples, a location of the null tones may be dynamically signaled.

In some examples, the determining may include computing an energy of a signal received during the interference detection opportunity, and determining an interfering signal is present when the computed energy is greater than a noise floor threshold. The interference detection opportunity may include, in some examples, two or more reserved null tones during an LTE signal transmissions in an unlicensed spectrum, and computing the energy of the signal received may include computing an average energy of signals received during the interference detection opportunity. The interfering signals may include, for example, WiFi signals in the unlicensed spectrum.

In other examples, the characteristics of the wireless signal transmission may comprise an LTE signal second order periodicity in an unlicensed spectrum and an interfering signal second order periodicity. The LTE second order periodicity may be 66.7 microseconds and the interfering signal second order periodicity may be 3.2 microseconds. In some examples, monitoring transmission in the unlicensed spectrum may comprise receiving one or more transmissions on one or more carrier frequencies in the unlicensed spectrum and determining a second order periodicity of one or more signals modulated onto each of the received carrier frequencies.

In some examples, determining the presence of the interfering signal may be based on the second order periodicity of the one or more signals modulated onto each of the received carrier frequencies and based on the transmission characteristics of the wireless signal transmission and an interfering signal transmission. In other examples, determining the presence of the interfering signal may comprise determining whether the received carrier frequencies exhibit a second order periodicity different than a LTE signal second order periodicity in an unlicensed spectrum.

In a second set of illustrative examples, an apparatus for wireless communications is provided. The apparatus generally includes a processor and a coupled to the processor. The processor may be configured to identify characteristics for wireless signal transmissions in an unlicensed spectrum. The processor may be further configured to identify, based at least in part on the characteristics, at least one interference detection opportunity in which interfering signals in the unlicensed spectrum may be detected. The unlicensed spectrum may be monitored for transmissions during the interference detection opportunity, and the method may determine presence of interfering signals responsive to the monitoring. In some examples, the processor may be further configured to mitigate interference based in part on the determination of interference. In certain examples, the apparatus may implement one or more aspects of the method for wireless communications described above with respect to the first set of illustrative examples.

In a third set of illustrative examples, an apparatus for wireless communications is provided. The apparatus generally includes means for identifying characteristics for wireless signal transmissions in an unlicensed spectrum. The apparatus may further include means for identifying, based at least in part on the characteristics, at least one interference detection opportunity in which interfering signals in the unlicensed spectrum may be detected. The unlicensed spectrum may be monitored for transmissions during the interference detection opportunity, and the method may determine presence of interfering signals responsive to the monitoring. In some examples, the apparatus may further comprise mitigating interference based in part on the determination of interference. In certain examples, the apparatus may implement one or more aspects of the method for wireless communications described above with respect to the first set of illustrative examples.

In a fourth set of illustrative examples, a non-transitory computer-readable medium may store instructions executable by a processor. The instructions may include instructions to identify characteristics for wireless signal transmissions in an unlicensed spectrum; and instructions to identify, based at least in part on the characteristics, at least one interference detection opportunity in which interfering signals in the unlicensed spectrum may be detected. The instructions may further include instructions to monitor the unlicensed spectrum for transmissions during the interference detection opportunity, and instructions to determine a presence of interfering signals responsive to the monitoring. In some examples, the instructions may further include instructions for mitigating interference based in part on the determination of interference. In certain examples, the computer-readable medium may implement one or more aspects of the method for wireless communications described above with respect to the first set of illustrative examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
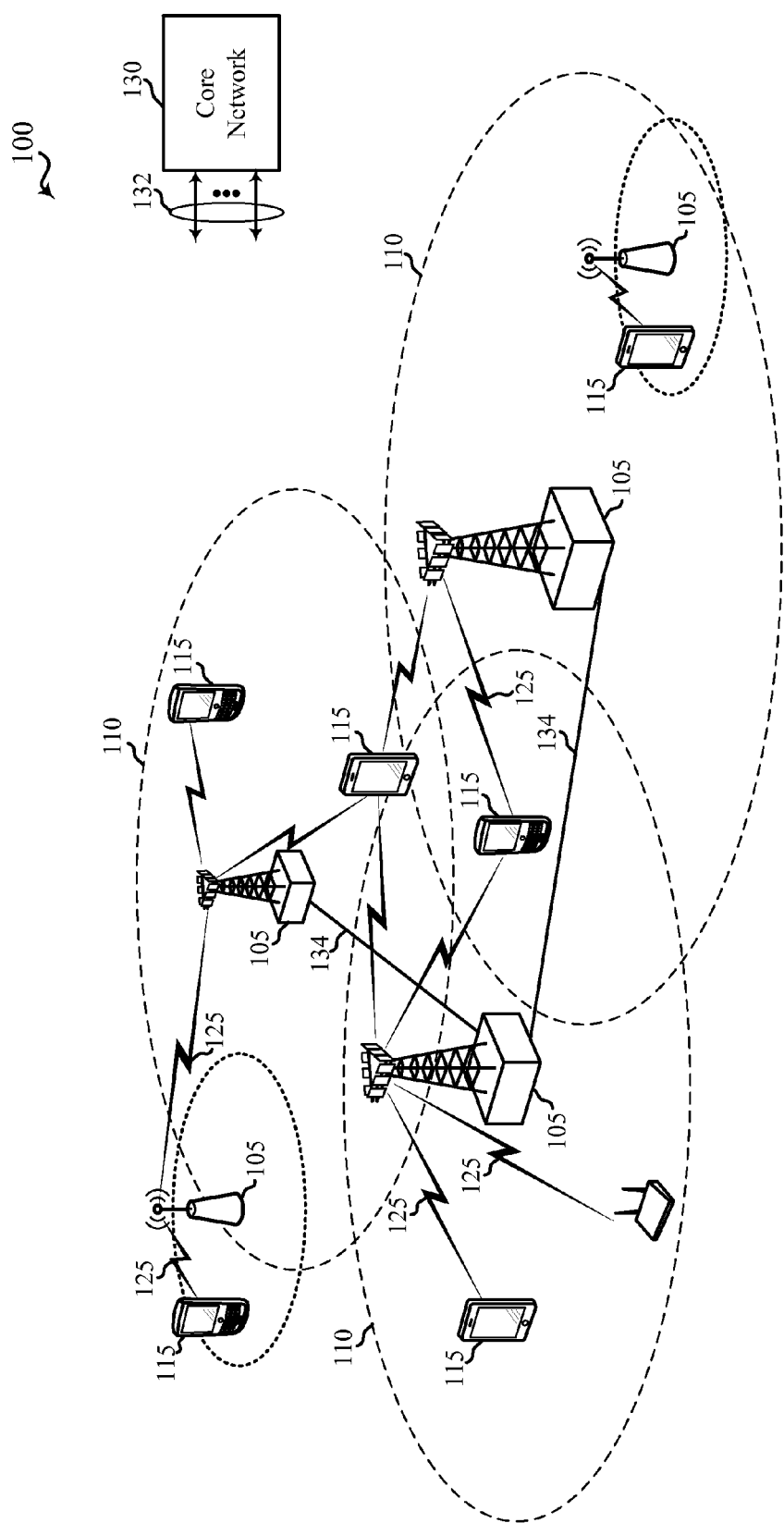
FIG. 1 shows a diagram of a wireless communications system.

Methods, apparatuses, systems, and devices are described in which an unlicensed spectrum (e.g., a spectrum typically used for WiFi communications) may be used for cellular communications (e.g., Long Term Evolution (LTE) communications).

With the increase in traffic because of offloading from cellular networks, access to unlicensed spectrum may provide operators with opportunities for enhanced data transmission capacity. The use of such unlicensed spectrum may result in interfering signals from other devices in the unlicensed spectrum, however. Detection of one or more interfering signals in a particular frequency spectrum may allow for one or more interference cancellation or interference suppression techniques to be applied, which may improve system performance. Detection of the presence of such interfering signals may be accomplished according to various embodiments using several different techniques.

For example, signal characteristics may be identified for a signal of interest in the spectrum, such as a signal that is desired to be received at a wireless communications device. Based at least in part on the characteristics one or more interference detection opportunities may be identified, during which interfering signals in the spectrum may be detected. Interference detection opportunities may include, for example, periods when the signal of interest may be absent from the particular frequency spectrum. Transmissions in the frequency spectrum may be monitored during the interference detection opportunity to determine the presence of one or more interfering signals.

In some aspects, different transmission characteristics for wireless signal transmissions in a particular frequency spectrum may be identified for an interfering signal and a signal of interest. The interfering signal may be, for example, signals commonly transmitted using the particular frequency spectrum (e.g., WiFi signals), and the signal of interest may be a signal transmitted and received by a particular wireless device. The different signals may have unique properties, such as different second order periodicities. Signals may be received on one or more carrier frequencies in the frequency spectrum, and a second order periodicity of one or more signals modulated onto each of the received carrier frequencies may be determined. The presence of one or more interfering signals may be detected based on the second order periodicity of the one or more signals modulated onto each of the received carrier frequencies and based on the transmission characteristics of the wireless signal transmission and interfering signal transmission. For example, expected interfering signals may have a known second order periodicity that is different than the second order periodicity of the signal of interest.

The techniques described herein may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some embodiments, the system 100 may include an LTE/LTE-A communications system (or network) that supports one or more modes of operation or deployment scenarios, and may employ multiple component carriers having synchronized listening intervals and coordinated clear channel assessments (CCAs). In other embodiments, the system 100 may support wireless communications using an unlicensed spectrum and an access technology different from LTE/LTE-A communications in the unlicensed or shared spectrum, or a licensed spectrum and an access technology different from LTE/LTE-A. In LTE/LTE-A communications systems, the term evolved NodeB or eNB may be generally used to describe of the access points 105. The system 100 may be a Heterogeneous LTE/LTE-A network in which different types of eNBs provide coverage for various geographical regions.

For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A small cell such as a pico cell may cover a relatively smaller geographic area and may allow unrestricted access by UEs with service subscriptions with the network provider. A small cell such as a femto cell may also cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB, and an eNB for a small cell may be referred to as a pico eNB, a femto eNB, a home eNB, and the like, depending upon the deployment, and may be generally referred to as small cell eNBs. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), an unlicensed spectrum, or both. Similarly, the uplink transmissions may be made using a licensed spectrum (e.g., LTE), an unlicensed spectrum, or both.

In some embodiments of the system 100, various deployment scenarios for LTE/LTE-A communications in an unlicensed or shared spectrum may be supported including a SDL mode in which LTE downlink capacity in a licensed spectrum may be offloaded to an unlicensed spectrum, a CA mode in which both LTE downlink and uplink capacity may be offloaded from a licensed spectrum to an unlicensed spectrum, and a SA mode in which LTE downlink and uplink communications between a base station (e.g., eNB) and a UE may take place in an unlicensed spectrum. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum. Transmissions using the unlicensed spectrum may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, as mentioned above, a device seeking to transmit using unlicensed spectrum may be required to verify that the spectrum is available for use in such a transmission, that is, the spectrum is not already in use by one or more other devices. For example, a CCA may be used to determine availability of the unlicensed spectrum. Performance of a CCA generally involves checking that the desired spectrum is not otherwise occupied prior to initiating transmissions. In some embodiments, CCA opportunities are coordinated across multiple eNBs 105, and may occur at periodic listening intervals, such as every 10 ms. A transmitting entity, such as an eNB 105, may desire channel access and perform CCA to determine if a particular carrier frequency in the unlicensed spectrum is occupied. If the particular carrier frequency in the unlicensed spectrum is occupied, the eNB 105 waits until the next CCA opportunity before attempting to obtain channel access again on the associated carrier frequency.

In situations where a successful CCA is performed, a device may transmit using the unlicensed spectrum. However, even though there was a successful CCA, periodic interference may still be encountered. According to various embodiments described herein, various techniques may be used to detect the presence of such interference for each OFDM symbol transmitted in the unlicensed or shared spectrum. The detection of such interference may allow a receiver, such as a UE 115, to perform interference cancellation techniques in order to mitigate the effect of interference that may be present. Additional details regarding the detection of interfering signals in various LTE/LTE-A communications in an unlicensed or shared spectrum deployment scenarios or modes of operation in a system, such as the system 100, as well as other features and functions are provided below with reference to FIGS. 2-14.

Figure 2:
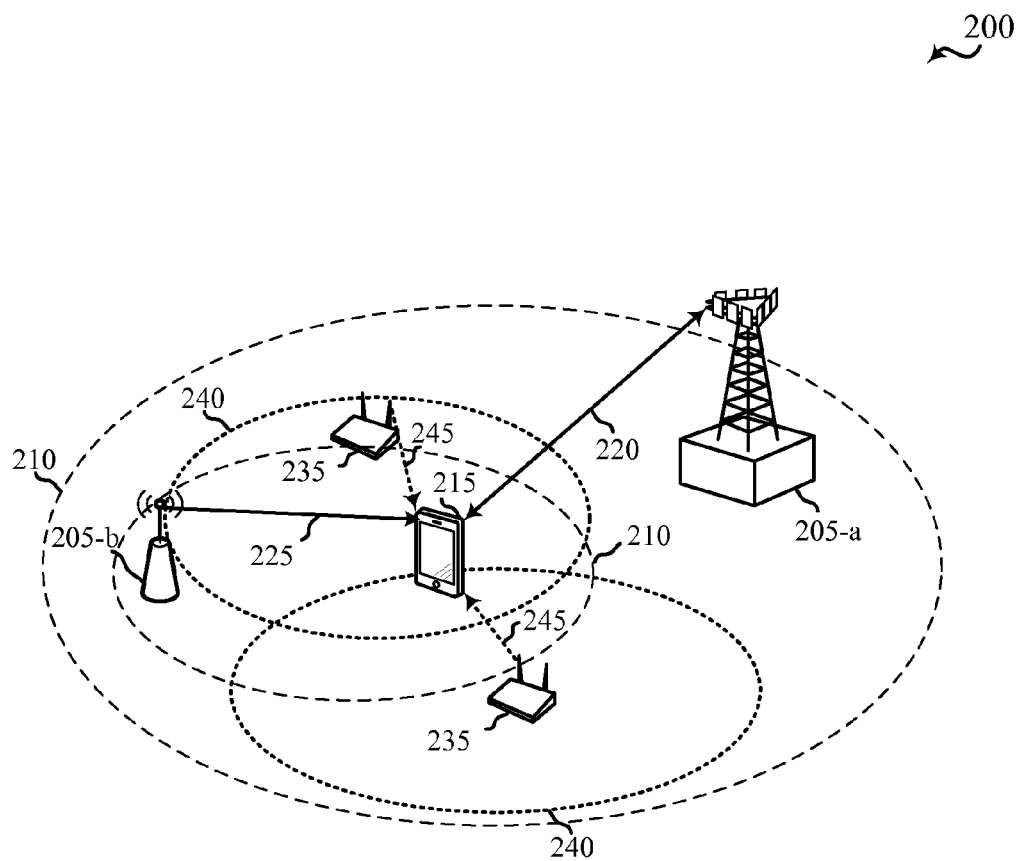
FIG. 2 illustrates an example of a wireless communications system in which an LTE node and one or more different WiFi nodes may transmit during a time period, according to various embodiments.

With reference now to FIG. 2, a diagram illustrating an example of a wireless communications system 200 in which interference may occur is described. The system 200 may be an example of portions of the system 100 described with reference to FIG. 1. System 200 includes a number of eNBs 205, which may be examples of aspects of the access points 105 described with reference to FIG. 1. The eNBs 205 may communicate with UE 215, which may be an example a UE 115 described with reference to FIG. 1. In the example of FIG. 2, a macro eNB 205-a may communicate with UE 215 using bidirectional link 220, and small cell eNB 205-b may communicate with UE 215 using downlink 225. Each eNB 205 may have a corresponding coverage area 210. According to some embodiments, bidirectional link 220 may be transmitted using licensed spectrum, and downlink 225 may be transmitted using unlicensed spectrum according to various modes of communication.

Downlink 225 may be transmitted to the UE 215 in a supplemental downlink (SDL) mode of LTE/LTE-A communications in an unlicensed or shared spectrum, for example. The downlink 225 may provide a downlink capacity offload for the eNB 205-a. In some embodiments, the downlink 225 may be used for unicast services (e.g., addressed to one UE) or for multicast services (e.g., addressed to several UEs). This scenario may occur with any service provider (e.g., a traditional mobile network operator or MNO) that uses a licensed spectrum and needs to relieve some of the traffic and/or signaling congestion, for example. Other modes of LTE/LTE-A communications in an unlicensed or shared spectrum may include carrier aggregation (CA) mode and standalone (SA) mode. When operating in CA mode, the eNB 205-b may transmit OFDMA communications signals to a UE 215 using a bidirectional link in an unlicensed spectrum and may receive SC-FDMA communications signals from the same UE 215 using the bidirectional link. In SA mode, the eNB 205-b may transmit OFDMA communications signals to a UE 215 using a bidirectional link using a frequency in an unlicensed spectrum and may receive SC-FDMA communications signals from the same UE 215 using the bidirectional link. Like the SDL mode, CA mode and SA mode may be utilized in various different scenarios, such as with any service provider (e.g., an MNO) that uses a licensed spectrum and needs to relieve some of the traffic and/or signaling congestion.

As mentioned above, transmissions in the unlicensed spectrum may be required to employ a contention-based protocol, such as a Listen Before Talk (LBT) protocol based on the LBT protocol specified in ETSI (EN 301 893). When using a gating interval that defines the application of an LBT protocol, the gating interval may indicate a listening interval when a transmitting device needs to perform a Clear Channel Assessment (CCA). The outcome of the CCA indicates to the transmitting device whether a channel of the unlicensed spectrum is available or in use. When the CCA indicates that the channel is available (e.g., "clear" for use), the gating interval may allow the transmitting device to use the channel—typically for a predefined transmission period. When the CCA indicates that the channel is not available (e.g., in use or reserved), the gating interval may prevent the transmitting device from using the channel during the transmission period. In other embodiments, different contention-based protocols may be used, such as carrier sense multiple access (CSMA) protocol with collision detection, for example.

In the example of FIG. 2, WiFi nodes 235 may have corresponding coverage areas 240, and may transmit WiFi signals 245 which may be interfering signals for UE 215. In some situations, even though eNB 205-b may have successfully performed a CCA for access to the unlicensed spectrum, a WiFi node 235 may transmit an interfering signal 245 while eNB 205-b is transmitting downlink signal 225. For example, a WiFi node 235 may start transmitting after the CCA has been completed. Such WiFi interference may significantly degrade the forward error rate (FER) for LTE/LTE-A communications in an unlicensed or shared spectrum and reduce throughput due to incorrect channel quality indicator (CQI) feedback. According to various embodiments described herein, various techniques may be used to detect the presence of such interference for each OFDM symbol transmitted over the unlicensed or shared spectrum. Furthermore, although interference in this example is described from a WiFi node 235, such interference may be the result of other types of transmissions. For example, a neighboring eNB (not shown) may communicate with a different UE using time division duplex (TDD) communications, in which different uplink or downlink subframes may present such interference.

The detection of such interference may provide for more accurate channel estimation and may enhance the accuracy of channel state information (CSI) feedback. For example, a UE may perform channel estimation and generate estimations of certain parameters, such as a precoding matrix indicator (PMI), CQI, etc., using an interference free part of the subframe. In some embodiments, a UE (or other receiver) may perform non-sequential code block decoding, in which interference free code blocks may be decoded first, and channel estimates may then be improved using data aided channel estimation. The improved channel estimates may then be used to enhance interference cancellation for reference signal (RS) symbols that are affected by interference using the new data aided channel estimates. In some cases, null tones created by cancelled RS symbols may be used to refine the estimates of the presence of interference in a given OFDM symbol, and channel estimation parameters may be further refined.

In the case of WiFi interference, the type of interference that is present may depend upon the particular type of WiFi signal that is being transmitted. Thus, classification of the type of interfering signal may be used to assist in interference mitigation. For example, 802.11b and 802.11g use a 2.4 GHz frequency band for wireless transmissions. However, 802.11a/n/ac, for example, use a 5 GHz frequency band. Additionally, the 5 GHz frequency band may offer at least 23 non-overlapping channels, while the 2.4 GHz frequency band may have overlapping channels. Furthermore, WiFi signals may have different bandwidths, such as 20 MHz, 40 MHz, 80 MHz, and 160 MHz, for example.

Figure 3:
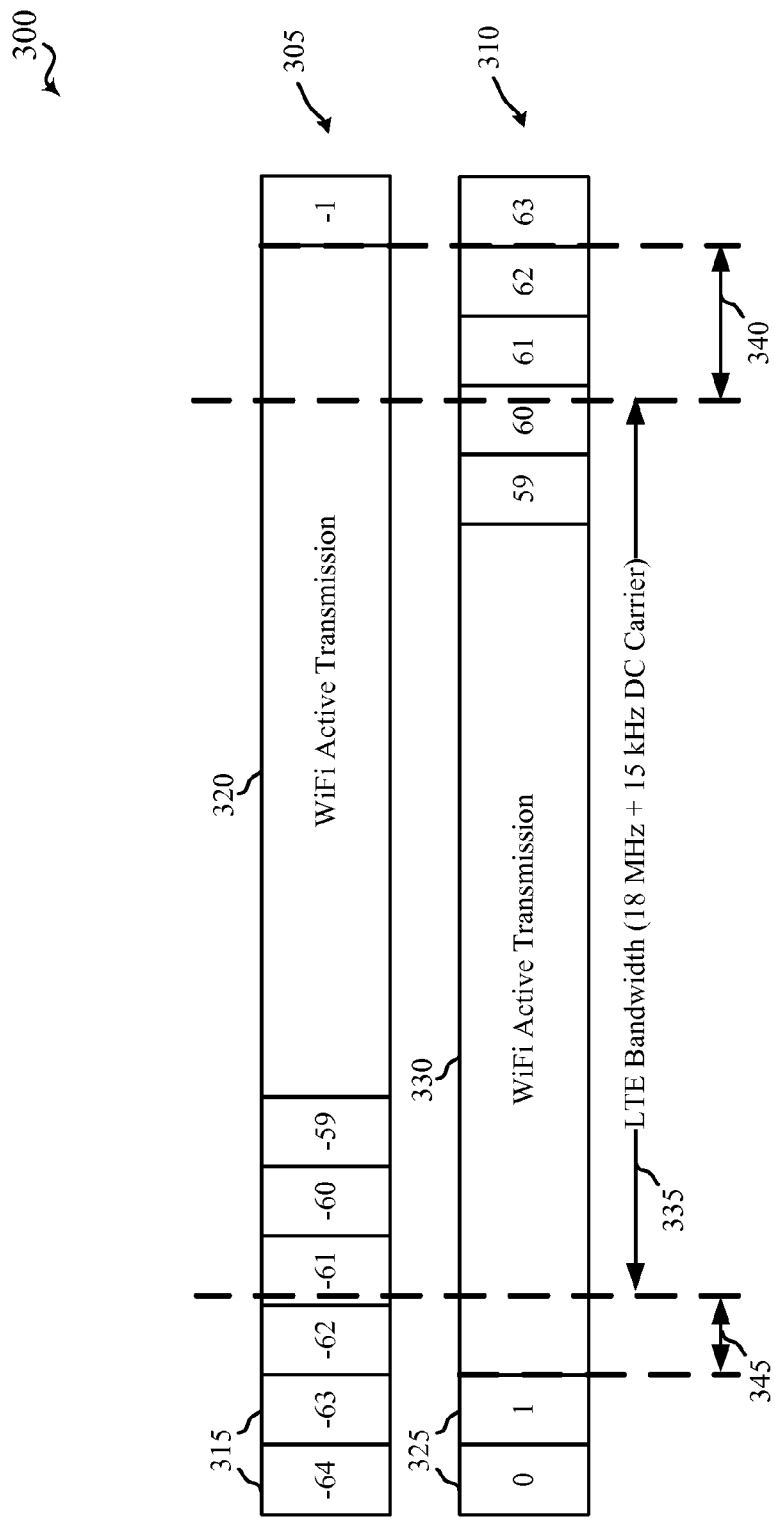
FIG. 3 illustrates an example of WiFi transmissions compared with LTE/LTE-A communications in an unlicensed or shared spectrum transmissions in a particular frequency spectrum according to various embodiments.

Such different potential characteristics of interfering signals may present challenges in detection of the type of interference that may be present. For example, if a WiFi preamble could be reliably detected, the characteristics of the particular signal could be determined for interference mitigation purposes. However, in many cases reliable detection of such information may not be possible, and other techniques may be used for interfering signal detection. FIG. 3 illustrates an example 300 of a lower 20 MHz band 305 and an upper 20 MHz band 310. The lower 20 MHz band 305 may include a number of subcarriers 315, numbered as subcarrier −64 through −1. A WiFi active transmission 320 may be present in this lower 20 MHz band 305, and may occupy subcarriers −58 through −2, in this example. In the upper 20 MHz band 310, subcarriers 315 include subcarriers 0 through 63. WiFi active transmission 330 may occupy subcarriers 2 through 58, in this example.

According to some embodiments, LTE/LTE-A communications in an unlicensed or shared spectrum transmissions may be transmitted using the upper and lower 20 MHz frequency bands 305, 310. The LTE/LTE-A communications in the unlicensed or shared spectrum transmissions may have an LTE bandwidth 335, which may be 18 MHz plus a 15 kHz DC carrier, thereby providing a 1 MHz guard band on each side of the LTE bandwidth 335 for both the upper and lower frequency bands 305, 310. Thus, in the lower frequency band 305, there is an area 340 in which WiFi active transmission 320 is transmitted that is outside of the LTE bandwidth 340. Similarly, in the upper frequency band 310, there is an area 345 in which WiFi active transmission 345 is transmitted outside of the LTE bandwidth 335.

The LTE bandwidth 335 may be used to transmit data frames by an eNB and/or UE that support LTE/LTE-A communications in an unlicensed or shared spectrum. Examples of such an eNB may be the base stations 105 and/or 205 of FIG. 1 and/or FIG. 2, respectively. Examples of such a UE may be the UEs 115 and/or 215 of FIG. 1 and/or FIG. 2, respectively. According to various embodiments, periods 340 and 345 may be determined based on characteristics of the particular wireless signal transmissions, and may be utilized as interference detection opportunities based on the absence of LTE/LTE-A signals in the unlicensed or shared spectrum during the periods 340, 345. Transmissions may be monitored during these periods 340, 345, and the presence of interfering signals may be determined based on such monitoring. If such a WiFi signal is present, than WiFi interference may be determined to be present, and if such a WiFi signal is not present it may be determined that there is an absence of interference. According to some embodiments, the energy of signals received at the noted frequencies may be measured and compared to a noise floor. If the detected energy is greater than a threshold value above the noise floor, it may be determined that interference is present. According to some embodiments, such a threshold may be selected enhance detection probability with a fixed false alarm rate. Thus, the presence of such an interfering signal may be detected without requiring a preamble associated with the signal to be detected and decoded. Techniques such as illustrated in FIG. 3 may be used to determine the presence of a WiFi 802.11n/ac signal, for example, which have null carrier locations as illustrated in FIG. 3. Similar techniques could be used for other signals, as well for signals having wider bandwidth, such as for 802.11ac 80 MHz and 160 MHz transmissions.

As noted above, in some embodiments an energy of certain frequencies may be detected and used to determine the presence of absence of interfering signals. Such an energy based metric may be computed for different frequency bands as well based on a hypothesis for the frequency signature of the WiFi signal. For example, a total energy of overlapping frequency bands for LTE/LTE-A type signals and WiFi signals in the unlicensed or shared spectrum may be computed, assuming that both the LTE/LTE-A type signals and WiFi signals are present may be computed. Similarly, an energy may be computed assuming that LTE/LTE-A type signals are absent from the unlicensed or shared spectrum but WiFi signals are present. Additionally or alternatively, an energy may be computed assuming that both LTE/LTE-A-type signals are present in the unlicensed or shared spectrum and WiFi signals are absent. Such computed energy metrics may be used for different portions of the unlicensed spectrum to identify the presence or absence of interfering signals.

Furthermore, WiFi signals exhibit different frequency signatures based on their location in the signaling band. As illustrated in FIG. 3, WiFi active transmission 320 is located on the left side of the entire 40 MHz frequency band (denoted L), while WiFi active transmission 330 is located on the right side of the frequency band (denoted R). In some embodiments, frequency signatures may be categorized into three categories based on the location of the 20 MHz band within the whole WiFi signal. For a 40 MHz transmission, the L band may have a first frequency signature, and the R band may have a second frequency signature. For an 80 MHz transmission, an LL band may have the first frequency signature, an RR band may have the second frequency signature, and LR or RL may have a third frequency signature. For a 160 MHz transmission, LLL and RLL may have the first frequency signature, LRR and RRR may have the second frequency signature, and LLR, LRL, RLR, and RRL may have the third frequency signature. Furthermore, for the 80 MHz transmission, transmissions located in a right and left, or left and right, frequency bands may have a third frequency signature. The frequency signatures, if detected in a certain portion of a received interfering signal, may, in some embodiments, be used to determine that interference may also be present in other frequencies associated with the particular frequency signature. For example, if a LLL frequency signature is detected in a lower 20 MHz band, it may be determined that WiFi interference will likely be present in the other two associated 20 MHz bands.

Figure 4:
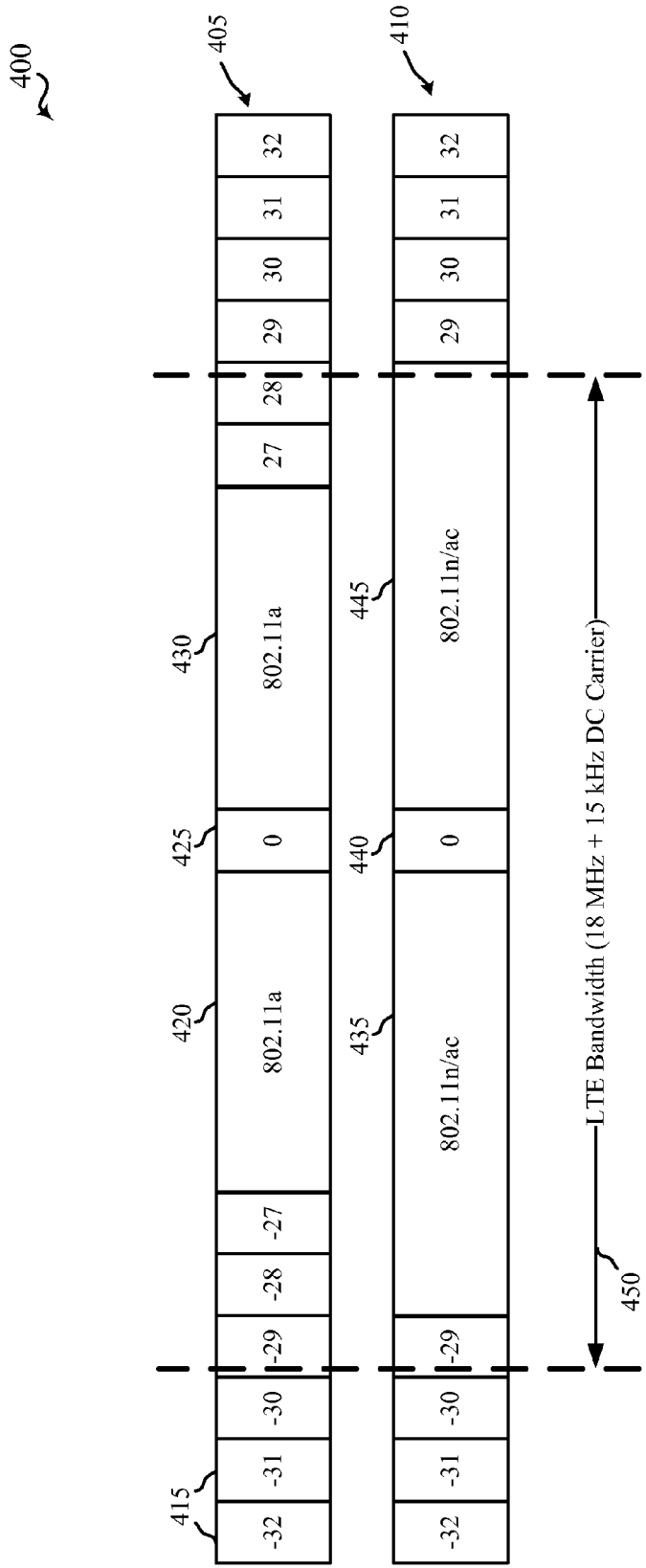
FIG. 4 illustrates an example of WiFi transmissions compared with LTE/LTE-A communications in an unlicensed or shared spectrum transmissions in a particular frequency spectrum according to various embodiments.

With reference now to FIG. 4, an illustration of an example 400 of a 20 MHz band 405 of a 20 MHz 802.11a signal, and a 20 MHz band 410 of a 20 MHz 802.11n/ac signal. A WiFi active transmission using 802.11a may contain transmissions 420 and 430. Similarly as with FIG. 3, WiFi transmissions may be transmitted on a number of subcarriers 415. In the 801.11a example of FIG. 4, transmission 420 may occupy subcarriers −26 to −1, and transmission 430 may occupy subcarriers 1 to 26. Subcarrier 425 may be a DC subcarrier. Similarly, 801.11n/ac transmissions 435 and 445 may occupy subcarriers −28 to −1, and 1 to 28, respectively, on either side of subcarrier 440, which may be a DC subcarrier. LTE bandwidth 450, similarly as discussed above, may include an 18 MHz bandwidth with a 15 kHz DC carrier, thereby providing a 1 MHz guard band on each side of the LTE bandwidth 335 for the 20 MHz frequency bands 405 and 410. The LTE bandwidth 450 may be used to transmit data frames by an eNB and/or UE that support LTE/LTE-A communications in an unlicensed or shared spectrum. Examples of such an eNB may be the base stations 105 and/or 205 of FIG. 1 and/or FIG. 2, respectively. Examples of such a UE may be the UEs 115 and/or 215 of FIG. 1 and/or FIG. 2, respectively.

Figure 5:
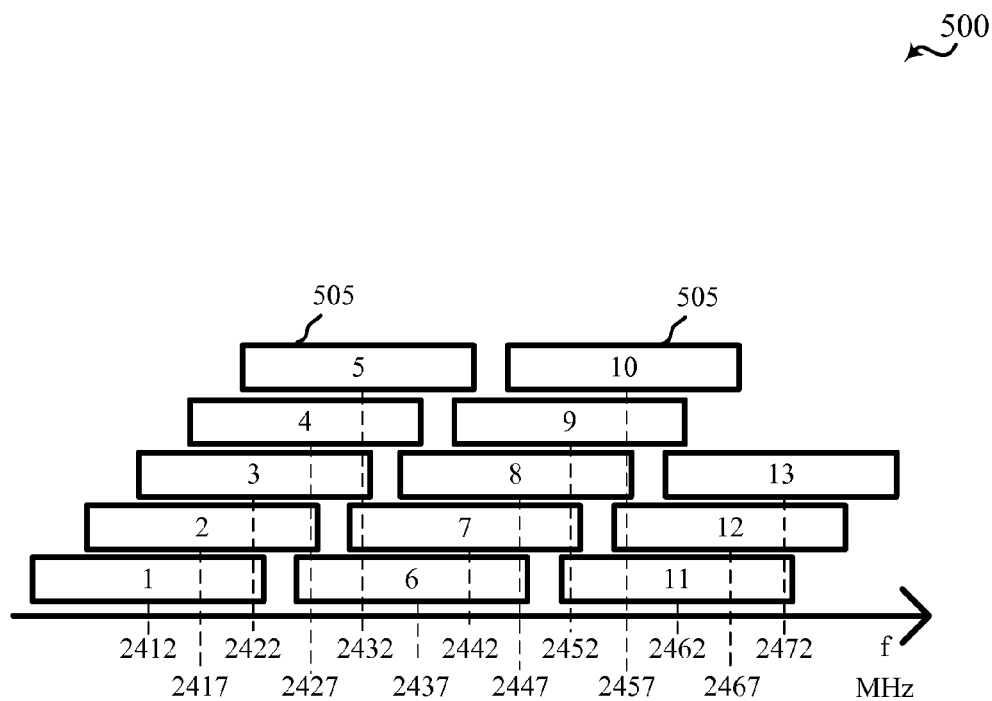
FIG. 5 illustrates an example of WiFi transmissions having overlapping channels according to various embodiments.

However, as the 20 MHz WiFi signals associated with 802.11a and 802.11n/ac do not extend significantly into the guard band around the LTE transmission 450, such guard band frequencies may not be reliably used to determine the presence or absence of such signals. Furthermore, the examples of FIGS. 3 and 4 would apply to WiFi signals transmitted using WiFi channels in the 5 GHz WiFi band. WiFi channels transmitted in the 2.4 GHz band have overlapping WiFi channels, and FIG. 5 is an illustration 500 showing the multiple channels 505 of the 2.4 GHz WiFi band. As indicated in this illustration 500, the center frequencies of each channel 505 have a 5 MHz spacing, and thus the 20 MHz channels overlap. Thus, detection of interference from interfering WiFi signals transmitted on the 2.4 GHz band may or may not be located in guard bands around LTE/LTE-A communications within a particular 20 MHz band of the unlicensed or shared spectrum transmissions.

In order to detect interfering signals in situations such as illustrated in FIGS. 4 and 5, according to some embodiments, null tones may be used for energy detection that may indicate the presence or absence of interfering signals. For example, with reference to FIG. 6, a diagram illustrates an example of a subframe structure 600 that may be used in a wireless communication system, including the wireless communication systems 100 and/or 200 described above with reference to FIGS. 1-2. The techniques discussed with respect to subframe structure 600 may, in various embodiments, be used to detect interference such as presented in FIGS. 3-5. In this example, the subframe structures 600 may be transmitted during a frame (10 ms) that may be divided into 10 equally sized subframes 600. Each subframe 600 may include two consecutive time slots, namely slot 0 and slot 1. An OFDMA component carrier may be illustrated as a resource grid representing two time slots. The resource grid may be divided into multiple resource blocks 610.

Figure 6:
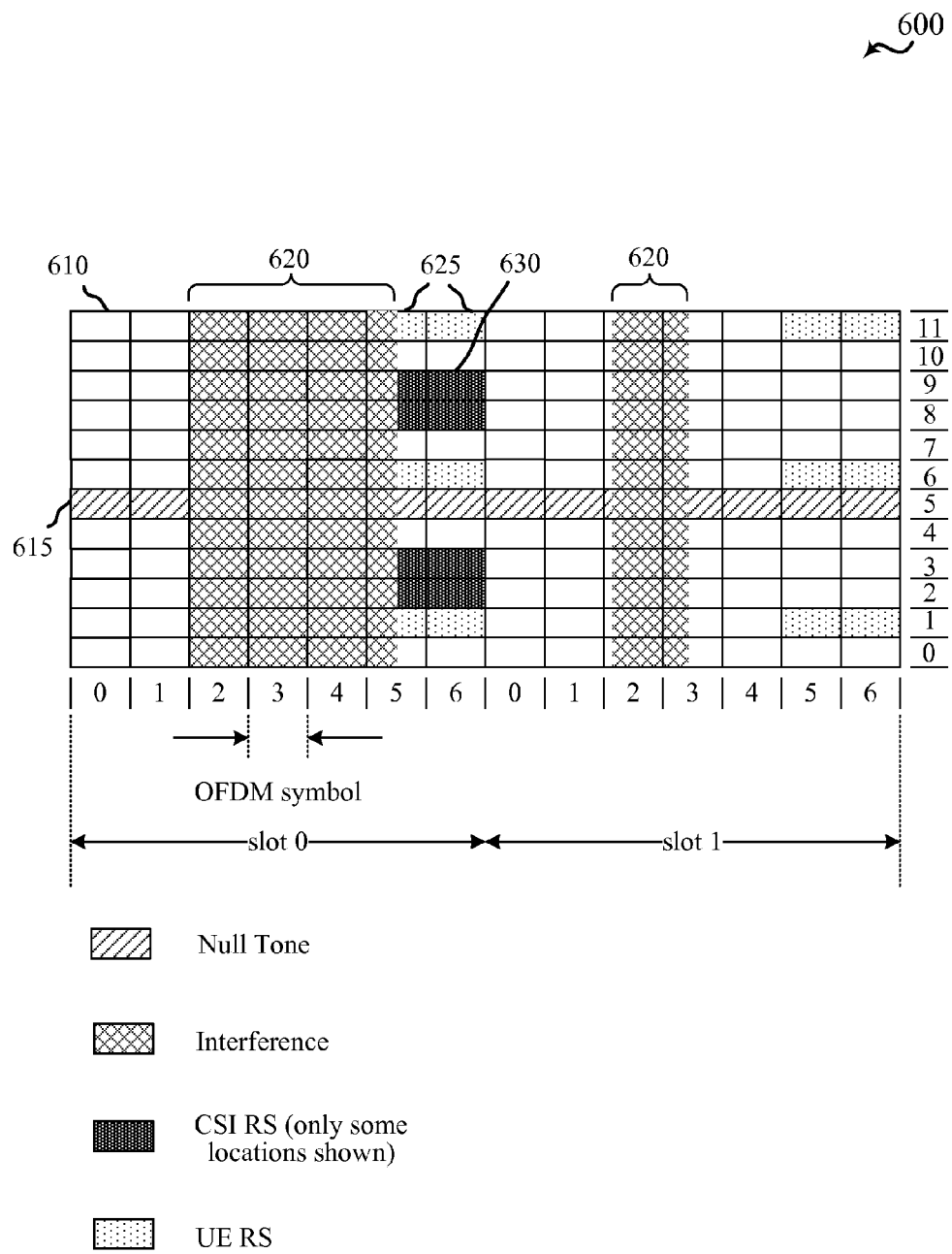
FIG. 6 illustrates an example of reserved empty resource blocks within an LTE/LTE-A signal transmission in an unlicensed or shared spectrum according to various embodiments.

In LTE/LTE-A, a resource block may contain 12 consecutive subcarriers (numbered 0-11 in FIG. 6) in the frequency domain and, for a normal cyclic prefix in each OFDM symbol, 7 consecutive OFDM symbols in the time domain, or 84 resource blocks 610 per slot. Some of the resource blocks, shaded and denoted 630, may include a reference signal (RS) such as a CSI RS. Note that other or additional resource blocks than illustrated in FIG. 6 may include such CSI-RS information. In the illustration of FIG. 6, a UE RS may also be transmitted using resource blocks such as resource blocks 625. A null tone 615 is illustrated in this example, in which LTE/LTE-A signals in an unlicensed or shared spectrum are not transmitted, and will be described in more detail below. In the example of FIG. 6, WiFi interference 620 may be present for a portion of the subframe 600.

The presence of WiFi interference, according to some embodiments, may be detected during by monitoring received frequencies during the null tone 615 for interfering signals. If an interfering signal is present, then interference, such as WiFi interference, may be determined to be present, and if a signal is not present it may be determined that there is an absence of interference. According to various embodiments, multiple null tones 615 may be spread out in time and frequency, or reserved empty resource blocks 610, may be used to detect interference. In some embodiments, for each OFDM symbol (71 us) an average energy may be computed using all the available null tones 615 and compared with a noise floor. If the detected energy is greater than a threshold value above the noise floor, it may be determined that interference is present. According to some embodiments, such a threshold may be selected enhance detection probability with a fixed false alarm rate. Thus, the presence of such an interfering signal may be detected without requiring a preamble associated with the signal to be detected and decoded. Techniques such as illustrated in FIG. 6 may be used to determine the presence of a any type of interfering signal, such as WiFi 802.11a/n/ac signals transmitted using 20, 40, 80, or 160 MHz bandwidths, for example. Furthermore, such techniques may be used to detect interfering signals on both the 5 GHz and 2.4 GHz bands.

As noted above, in some embodiments such an energy based metric may be computed for different frequency bands as well based on a hypothesis for the frequency signature of the WiFi signal. According to various embodiments, null tones 615 and/or reserved resource blocks 610, having an absence of LTE/LTE-A signals in an unlicensed or shared spectrum, may be characteristics of the particular wireless signal transmissions, and may be utilized as interference detection opportunities. Transmissions may be monitored during these interference detection opportunities and the presence of interfering signals may be determined based on such monitoring. For example, a total energy for non-null tones assuming that both LTE/LTE-A signals and WiFi signals are present in the unlicensed or shared spectrum may be computed. Similarly, an energy may be computed assuming that LTE/LTE-A signals are absent but WiFi signals are present in the unlicensed or shared spectrum may be computed, and an energy computed assuming that both LTE/LTE-A signals and WiFi signals are absent from the unlicensed or shared spectrum. Such computed energy metrics may be used for different resource blocks 610 to identify the presence of absence of interfering signals.

According to some embodiments, frequency density and location of null tone(s) 615, or reserved empty resource blocks 610, may be selected according to different criteria. Frequency density, for example, may be variable, such as one null tone in one, two, or three resource blocks. The number of null tones 615 may, in some embodiments, be varied either semi-statically or dynamically as a function of the traffic load of the system. Additionally, some additional resource blocks 610 may be reserved at the band edge to augment energy detection such as described above with respect to FIG. 3, according to some examples. The one or more reserved null resource blocks at the edge of the frequency band of each carrier may be transmitted to the UE or another eNB. In some embodiments, some resource blocks 610 may be unallocated to due light traffic load in the system, and such unallocated resource blocks 610 may also be used for detecting interference. Control channel signaling may be used, for example, to indicate locations of unallocated resource blocks 610.

In some cases, the location of null tones 615 may be non-uniform and may be selected based on characteristics of interfering signals most likely to be encountered, such as WiFi signals. For example, WiFi subcarrier spacing is 312.5 kHz, versus a 15 kHz subcarrier spacing for LTE/LTE-A communications in an unlicensed or shared spectrum. Thus, null tones 615 may be selected to have locations that may be varied to match the WiFi subcarrier peaks. Furthermore, time density of null tones 615 may be varied in some embodiments. In the example of FIG. 6, there is a null tone present in every OFDM symbol, although other embodiments may have different numbers of null tones 615 in each OFDM symbol. Having at least one null tone 615 in each OFDM symbol may allow enhanced interference detection, due to WiFi symbol duration being 4 microseconds, and LTE/LTE-A communications in an unlicensed or shared spectrum symbol duration being 71 microseconds. Thus, WiFi interference may end in the middle of an OFDM symbol and the next OFDM symbol may not experience interference.

As noted above, the location in time and/or frequency of null tones 615 may be varied according to various embodiments. In such cases, signaling of null tones 615 and/or reserved resource block 610 locations may be provided to a UE. Such signaling may include dynamic reservation, in which null tone 615 or reserved resource block 610 locations may be signaled using control channel signaling on a per subframe basis. In other embodiments, radio resource control (RRC) signaling may be used to signal null tone 615 or reserved resource block 610 locations. Such signaling may be indicated in an RRC connection setup/reconfiguration message transmitted to a UE. In other embodiments, semi-static signaling with information on the location of null tones 615 and/or reserved resource blocks 610 may be indicated in a system information block (SIB). The location of null tones 615 and/or resource block 610 locations may also be signaled using media access control (MAC) control elements or a downlink grant readable by all UEs in common search space. Additionally, neighboring eNBs, such as base stations 105 of FIG. 1 or eNBs 205 of FIG. 2, may coordinate null tones 615 and/or reserved resource blocks 610 such that eNBs covering a certain area use null tones 615 and/or reserved resource blocks 610 at the same time and frequency locations. Pattern and frequency of null tones 615 and/or reserved resource blocks 610 may be communicated between neighboring eNBs using, for example, the X2 interface.

In some embodiments, interference detection within a particular 20 MHz band may be used to monitor a larger bandwidth to exploit the fact that some wideband interfering signals may have wider bandwidth that 20 MHz, such as WiFi signals that may have 40/80/160 MHz bandwidths. For example, techniques such as described with respect to FIG. 3 or FIG. 6 may detect the presence of an interfering signal. As noted above, certain interfering signals may have frequency characteristics from which it may be inferred to that adjacent frequency bands may also have interference. For example, an interfering signal may be detected with the frequency signature of WiFi a 40 MHz upper band, and interference in an the LTE 20 MHz band may be inferred to also have WiFi interference.

While detection of energy levels in received signals is discussed above with respect to FIGS. 3-6, other embodiments may use different techniques for identification of interfering signals. In one example, second order periodicity may be determined for received signals, and the presence of particular second order periodicities in a signal may indicate the presence of an interfering signal. Such embodiments may take advantage of signal properties of modulated signals, which all exhibit cyclostationarity, also referred to as second order periodicity. WiFi signals, for example, have a second order periodicity of 3.2 microseconds, and LTE/LTE-A signals in an unlicensed or shared spectrum have a second order periodicity of 66.7 microseconds. Thus, second order periodicity for received signals may be determined, and if a second order periodic signal with 3.2 microseconds periodicity is detected, the presence of a WiFi interfering signal may be determined. For example, second order periodicity for received signals may be sampled according to a sampling frequency, such as once every 500 nanoseconds. If a peak is detected during a sample associated with the second order periodicity of a signal, it may be determined that such a signal is present. Thus, using the example of a WiFi signal with a 3.2 microsecond second order periodicity sampled once every 0.5 microsecond, if a peak is detected in the 64th sample, it may be determined that a WiFi signal is present. According to some embodiments, sampling may be collected for a number of periods in order to enhance confidence in a peak detected at a particular sample location.

According to some embodiments, detection of an interfering signal using second order periodicity may use one or more metrics to determine that such an interfering signal is present. In some examples, a magnitude squared coherence (MSC) metric (C) may be used to determine the presence or absence of an interfering signal. The MSC may be computed, in some embodiments, according to equations:

$$C_x^\alpha(f) \triangleq \frac{S_x^\alpha(f)}{[S_x^0(f + \alpha/2)S_x^0(f - \alpha/2)]^{1/2}}$$

$$S_x^\alpha(f) = \int_{-\infty}^{\infty} R_x^\alpha(\tau) e^{-i2\pi f \tau} d\tau$$

$$R_x^\alpha(\tau) \triangleq \lim_{T \to \infty} \frac{1}{T} \int_{-T/2}^{T/2} x(t + \tau/2) x^*(t - \tau/2) e^{-i2\pi \alpha t} dt$$

In which $\alpha$ corresponds to the second order periodicity frequency (e.g., 1/80 in normalized freq. for WiFi). The MSC value will be between 0 and 1, and a threshold value may be set to determine whether a particular signal is present or not.

Such second order periodicity techniques may be used to determine the presence of an interfering signal without requiring any null tones or knowledge of timing, frequency synchronization and/or symbol boundaries. Additionally, such techniques are not affected by the particular transmission channel for a signal. Furthermore, in embodiments there a receiver may use multiple antennas, additional signal samples from different antennas may be used to improve the MSC metric. Second order periodicity may also work well in negative geometries in cases where just noise is present, or where noise plus an interfering signal (e.g., a WiFi signal) are present. As noted above, in some cases a relatively large number of samples may be taken to improve reliability of the MSC metric.

Figure 7A:
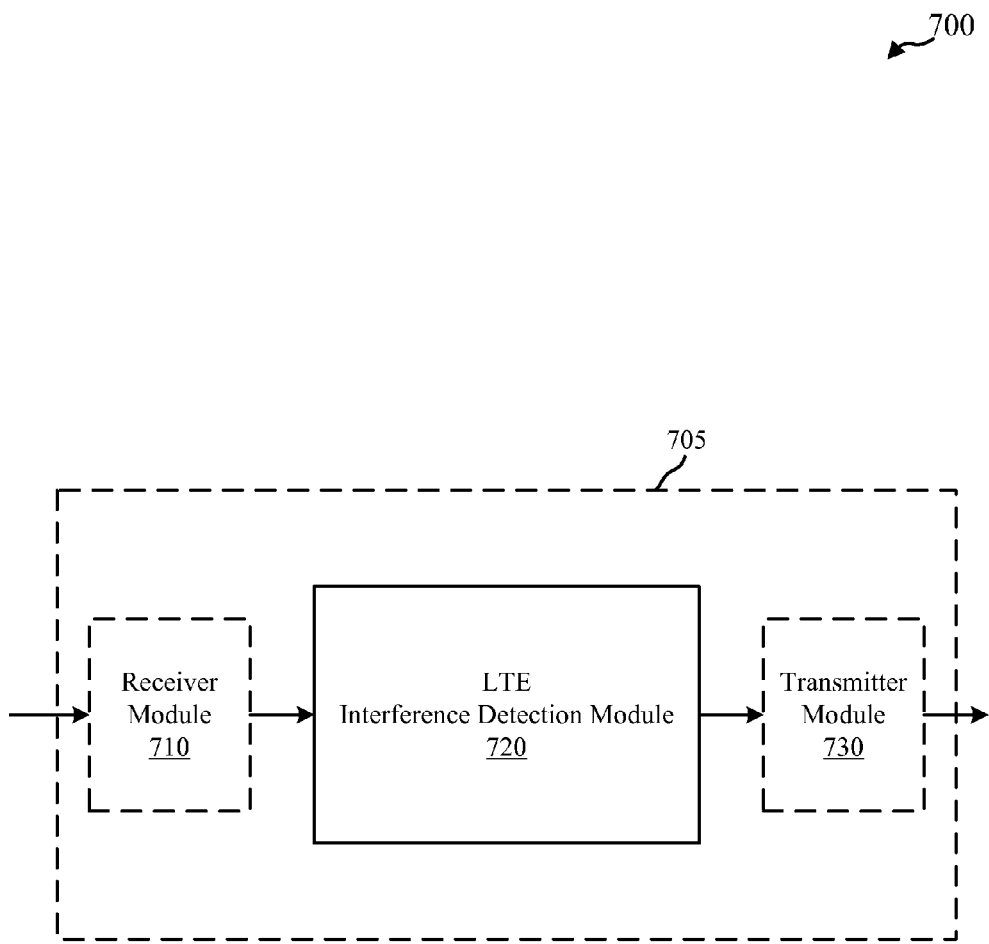
FIGS. 7A and 7B show block diagrams of examples of devices, such as eNBs or UEs, for use in wireless communications according to various embodiments.

Referring now to FIG. 7A, a block diagram 700 illustrates a device 705 for use in wireless communications in accordance with various embodiments. In some embodiments, the device 705 may be an example of one or more aspects of the eNBs 105 and/or 205 and/or UEs 115 and/or 215 described with reference to FIGS. 1 and/or 2. The device 705 may also be a processor. The device 705 may include a receiver module 710, an LTE interference detection module 720, and/or a transmitter module 730. Each of these components may be in communication with each other.

The components of the device 705 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 710 may be or include a radio frequency (RF) receiver, such as an RF receiver operable to receive transmissions in a licensed spectrum (e.g., an LTE spectrum) and/or an unlicensed spectrum. The receiver module 710 may be used to receive various types of data and/or control signals (i.e., transmissions) over one or more communication links of a wireless communications system including the licensed and unlicensed spectrums, such as one or more communication links of the wireless communications system 100 and/or 200 described with reference to FIGS. 1 and/or 2.

In some embodiments, the transmitter module 730 may be or include an RF transmitter, such as an RF transmitter operable to transmit in the licensed spectrum and/or the unlicensed spectrum. The transmitter module 730 may be used to transmit various types of data and/or control signals (i.e., transmissions) over one or more communication links of a wireless communications system, such as one or more communication links of the wireless communications system 100 and/or 200 described with reference to FIGS. 1 and/or 2.

In some embodiments, the LTE interference detection module 720 may detect the presence or absence of interfering signals, such as interfering WiFi signals, broadcast over an unlicensed spectrum. The interference detection may be performed according to any one or more of the techniques described above. According to some embodiments, interference detection may be performed during interference detection opportunities, which may be determined based on signal characteristics of received signals. Such signal characteristics may include the location of interfering signals in a broadcast spectrum, the presence of interfering signals in adjacent frequency bands to LTE frequency bands, and/or the location of null tones and/or reserved resource blocks, for example.

Figure 7B:
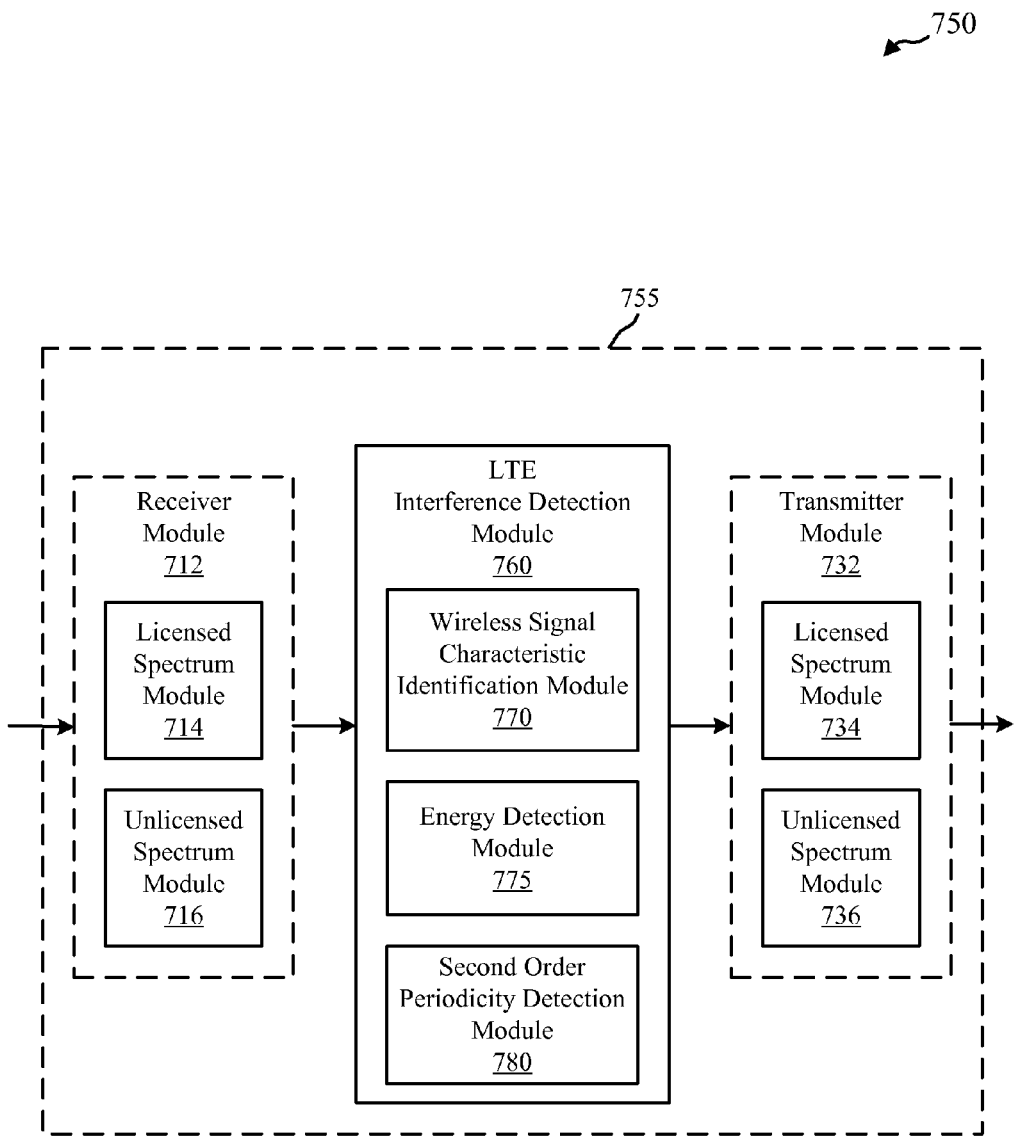

Referring now to FIG. 7B, a block diagram 750 illustrates a device 755 for use in wireless communications in accordance with various embodiments. In some embodiments, the device 705 may be an example of one or more aspects of the eNBs 105, 205 and/or UEs 115, 215 described with reference to FIGS. 1 and/or 2. The device 705 may also be a processor. The device 755 may include a receiver module 712, an LTE interference detection module 760, and/or a transmitter module 732. Each of these components may be in communication with each other.

The components of the device 755 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 712 may be an example of the receiver module 710 of FIG. 7A. The receiver module 712 may be or include a radio frequency (RF) receiver, such as an RF receiver operable to receive transmissions in a licensed spectrum (e.g., an LTE spectrum) and/or an unlicensed spectrum. The RF receiver may include separate receivers for the licensed spectrum and the unlicensed spectrum. The separate receivers may in some cases take the form of a licensed spectrum module 714 and an unlicensed spectrum module 716. The receiver module 712, including the licensed spectrum module 714 and the unlicensed spectrum module 716, may be used to receive various types of data and/or control signals (i.e., transmissions) over one or more communication links of a wireless communications system including the licensed and unlicensed spectrums, such as one or more communication links of the wireless communications system 100 and/or 200 described with reference to FIGS. 1 and/or 2.

In some embodiments, the transmitter module 732 may be an example of the transmitter module 730 of FIG. 7A. The transmitter module 732 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 734 and an unlicensed spectrum module 736. The transmitter module 732 may be used to transmit various types of data and/or control signals (i.e., transmissions) over one or more communication links of a wireless communications system, such as one or more communication links of the wireless communications system 100 and/or 200 described with reference to FIGS. 1 and/or 2.

The LTE interference detection module 760 may be an example of the LTE interference detection module 720 described with reference to FIG. 7A and may include a wireless signal characteristic identification module 770, an energy detection module 775, and/or a second order periodicity detection module 780. Each of these components may be in communication with each other.

In some embodiments, wireless signal characteristic identification module 770 may identify interference detection opportunities, which may be determined based on signal characteristics of received signals. Such signal characteristics may include the location of interfering signals in a broadcast spectrum, the presence of interfering signals in adjacent frequency bands to LTE frequency bands, and/or the location of null tones and/or reserved resource blocks, for example. The energy of received signal transmissions may be determined by energy detection module 775 in some embodiments. The detected energy during an interference detection opportunity may, for example, be compared against a noise floor threshold in order to determine the presence or absence of an interfering signal, such as a WiFi signal. In some embodiments, second order periodicity detection module 780 determine second order periodicity for received signals, and the presence of a second order periodicity that is different than a second order periodicity of received LTE/LTE-A signals in the unlicensed or shared spectrum may be used to determine the presence of interfering signals. For example, a second order periodicity corresponding to a WiFi signal may be detected, which may be used to determine the presence of an interfering WiFi signal.

Figure 8:
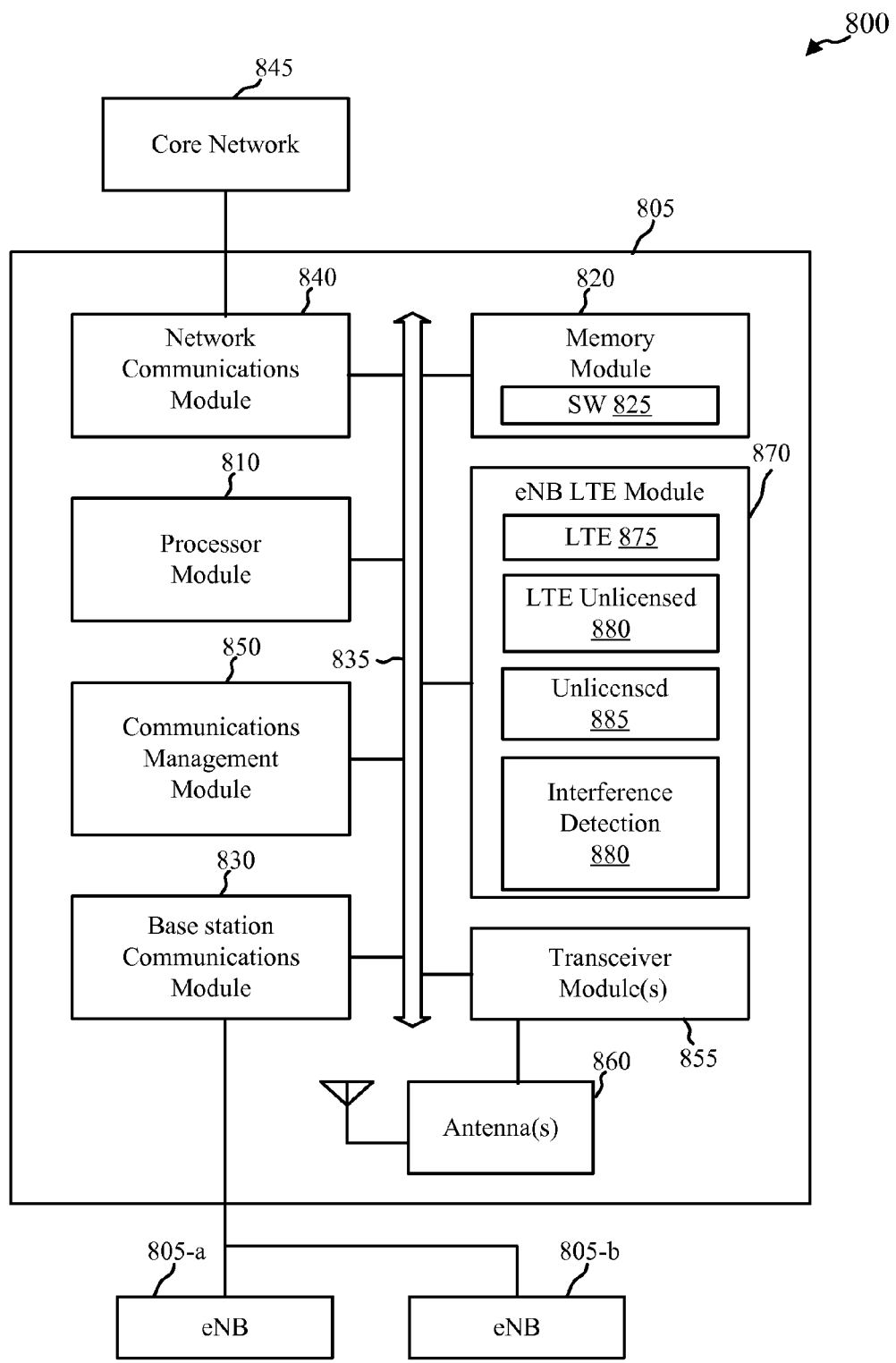
FIG. 8 shows a block diagram that illustrates an example of an eNB architecture according to various embodiments.

Turning to FIG. 8, a block diagram 800 is shown that illustrates an eNB 805 configured for LTE/LTE-A communications in an unlicensed or shared spectrum. In some embodiments, the eNB 805 may be an example of one or more aspects of the eNBs or devices 105, 205, 705, and/or 755 described with reference to FIGS. 1, 2, 7A and/or 7B. The eNB 805 may be configured to implement at least some of the spectrum interference detection features and functions for LTE/LTE-A in an unlicensed or shared spectrum described with respect to FIGS. 1, 2, 3, 4, 5, 6, 7A, and/or 7B. The eNB 805 may include a processor module 810, a memory module 820, at least one transceiver module (represented by transceiver module(s) 855), at least one antenna (represented by antenna(s) 860), and/or an eNB LTE module 870. The eNB 805 may also include one or both of a base station communications module 830 and a network communications module 840. Each of these components may be in communication with each other, directly or indirectly, over one or more buses 835.

The memory module 820 may include random access memory (RAM) and/or read-only memory (ROM). The memory module 820 may store computer-readable, computer-executable software (SW) code 825 containing instructions that are configured to, when executed, cause the processor module 810 to perform various functions described herein for using LTE-based communications in a licensed and/or unlicensed spectrum, including the performance of broadcast signal transmission over an unlicensed spectrum and interfering signal detection. Alternatively, the software code 825 may not be directly executable by the processor module 810 but be configured to cause the eNB 805, e.g., when compiled and executed, to perform various of the functions described herein.

The processor module 810 may include an intelligent hardware device, e.g., a central processing unit (CPU), a microcontroller, an ASIC, etc. The processor module 810 may process information received through the transceiver module(s) 855, the base station communications module 830, and/or the network communications module 840. The processor module 810 may also process information to be sent to the transceiver module(s) 855 for transmission through the antenna(s) 860, to the base station communications module 830 for transmission to one or more other base stations or eNBs 805-*a* and 805-*b*, and/or to the network communications module 840 for transmission to a core network 845, which may be an example of aspects of the core network 130 described with reference to FIG. 1. The processor module 810 may handle, alone or in connection with the eNB LTE module 870, various aspects of using LTE-based communications in a licensed and/or unlicensed spectrum, including the detection of interfering signals and synchronization of null tones or reserved resource blocks that may be synchronized across eNBs to enhance interference detection.

The transceiver module(s) 855 may include a modem configured to modulate the packets and provide the modulated packets to the antenna(s) 860 for transmission, and to demodulate packets received from the antenna(s) 860. The transceiver module(s) 855 may be implemented as one or more transmitter modules and one or more separate receiver modules. The transceiver module(s) 855 may support communications in at least one licensed spectrum (e.g., an LTE spectrum) and in at least one unlicensed spectrum. The transceiver module(s) 855 may be configured to communicate bi-directionally, via the antenna(s) 860, with one or more of the UEs or devices 115 and/or 215 described with reference to FIGS. 1 and/or 2, for example. The eNB 805 may typically include multiple antennas 860 (e.g., an antenna array). The eNB 805 may communicate with the core network 845 through the network communications module 840. The eNB 805 may communicate with other base stations or eNBs, such as the eNBs 805-*a* and 805-*b*, using the base station communications module 830.

According to the architecture of FIG. 8, the eNB 805 may further include a communications management module 850.

The communications management module 850 may manage communications with other base stations, eNBs, and/or devices. The communications management module 850 may be in communication with some or all of the other components of the eNB 805 via the bus or buses 835. Alternatively, functionality of the communications management module 850 may be implemented as a component of the transceiver module(s) 855, as a computer program product, and/or as one or more controller elements of the processor module 810.

The eNB LTE module 870 may be configured to perform and/or control some or all of the eNB communication functions in an unlicensed or shared spectrum or aspects described with reference to FIGS. 1, 2, 3, 4, 5, 6, 7A and/or 7B related to interference detection in LTE-based communications in a licensed and/or unlicensed spectrum. For example, the eNB LTE module 870 may be configured to support interference detection and coordination of reserved null tones or resource elements with neighboring eNBs 805-*a* and 805-*b*. The eNB LTE module 870 may include an LTE module 875 configured to handle LTE communications, an LTE unlicensed module 880 configured to handle LTE communications and CCA for LTE communications, and/or an unlicensed module 885 configured to handle communications other than LTE in an unlicensed spectrum. The eNB LTE module 870 may also include an interference detection module 880 configured to perform, for example, any of the eNB LTE interference detection and coordination functions described with reference to FIGS. 1, 2, 3, 4, 5, 6, 7A, and/or 7B. The interference detection module 880 may be an example of similar modules (e.g., module 720 and/or module 760) described with reference to FIGS. 7A and/or 7B. The eNB LTE module 870, or portions of it, may include a processor and/or some or all of the functionality of the eNB LTE module 870 may be performed by the processor module 810 and/or in connection with the processor module 810.

Figure 9:
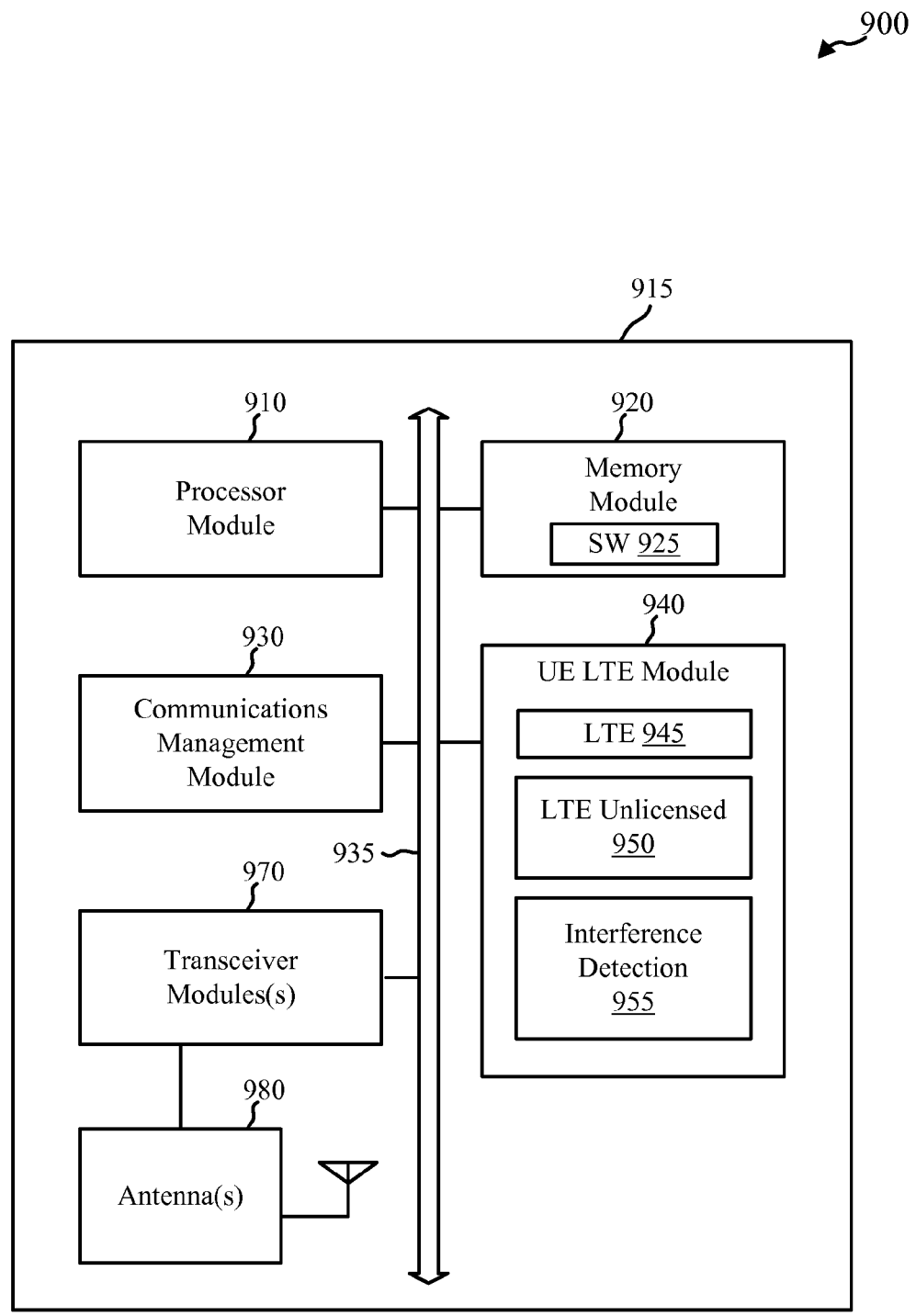
FIG. 9 shows a block diagram that illustrates an example of a UE architecture according to various embodiments.

Turning to FIG. 9, a block diagram 900 is shown that illustrates a UE 915 configured for LTE. The UE 915 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 915 may have an internal power supply (not shown), such as a small battery, to facilitate mobile operation. In some embodiments, the UE 915 may be an example of one or more of the UEs or devices 115 and/or 215 described with reference to FIGS. 1 and/or 2. The UE 915 may be configured to communicate with one or more of the eNBs or devices 105, 205, 705, 755, and/or 805 described with reference to FIGS. 1, 2, 7A, 7B, and/or 8.

The UE 915 may include a processor module 910, a memory module 920, at least one transceiver module (represented by transceiver module(s) 970), at least one antenna (represented by antenna(s) 980), and/or a UE LTE module 940. Each of these components may be in communication with each other, directly or indirectly, over one or more buses 935.

The memory module 920 may include RAM and/or ROM. The memory module 920 may store computer-readable, computer-executable software (SW) code 925 containing instructions that are configured to, when executed, cause the processor module 910 to perform various functions described herein for using LTE-based communications in a licensed and/or unlicensed spectrum. Alternatively, the software code 925 may not be directly executable by the processor module 910 but be configured to cause the UE 915

(e.g., when compiled and executed) to perform various of the UE functions described herein.

The processor module 910 may include an intelligent hardware device, e.g., a CPU, a microcontroller, an ASIC, etc. The processor module 910 may process information received through the transceiver module(s) 970 and/or information to be sent to the transceiver module(s) 970 for transmission through the antenna(s) 980. The processor module 910 may handle, alone or in connection with the UE LTE module 940, various aspects of using LTE-based communications in a licensed and/or unlicensed spectrum.

The transceiver module(s) 970 may be configured to communicate bi-directionally with eNBs. The transceiver module(s) 970 may be implemented as one or more transmitter modules and one or more separate receiver modules. The transceiver module(s) 970 may support communications in at least one licensed spectrum (e.g., an LTE spectrum) and in at least one unlicensed spectrum. The transceiver module(s) 970 may include a modem configured to modulate the packets and provide the modulated packets to the antenna(s) 980 for transmission, and to demodulate packets received from the antenna(s) 980. While the UE 915 may include a single antenna, there may be embodiments in which the UE 915 may include multiple antennas 980.

According to the architecture of FIG. 9, the UE 915 may further include a communications management module 930. The communications management module 930 may manage communications with various base stations or eNBs. The communications management module 930 may be a component of the UE 915 in communication with some or all of the other components of the UE 915 over the one or more buses 935. Alternatively, functionality of the communications management module 930 may be implemented as a component of the transceiver module(s) 970, as a computer program product, and/or as one or more controller elements of the processor module 910.

The UE LTE module 940 may be configured to perform and/or control some or all of the UE functions in an unlicensed or shared spectrum or aspects described in FIGS. 1, 2, 3, 4, 5, 6, 7, and/or 8 related to using LTE-based communications in a licensed and/or unlicensed spectrum. For example, the UE LTE module 940 may be configured to support interfering signal detection. The UE LTE module 940 may be configured to receive signals and determine the presence of one or more interfering signals based on interference detection opportunities and/or second order periodicity of received signals. The UE LTE module 940 may include an LTE module 945 configured to handle LTE communications, an LTE unlicensed module 950 configured to handle LTE communications, and/or an interference detection module 955. The interference detection module 955 may be an example of similar modules (e.g., module 720 and/or module 760) described with reference to FIGS. 7A and/or 7B, and may coordinate the detection of interfering signals according to one or more of the techniques described above. The UE LTE module 940, or portions of it, may include a processor and/or some or all of the functionality of the UE LTE module 940 may be performed by the processor module 910 and/or in connection with the processor module 910.

Figure 10:
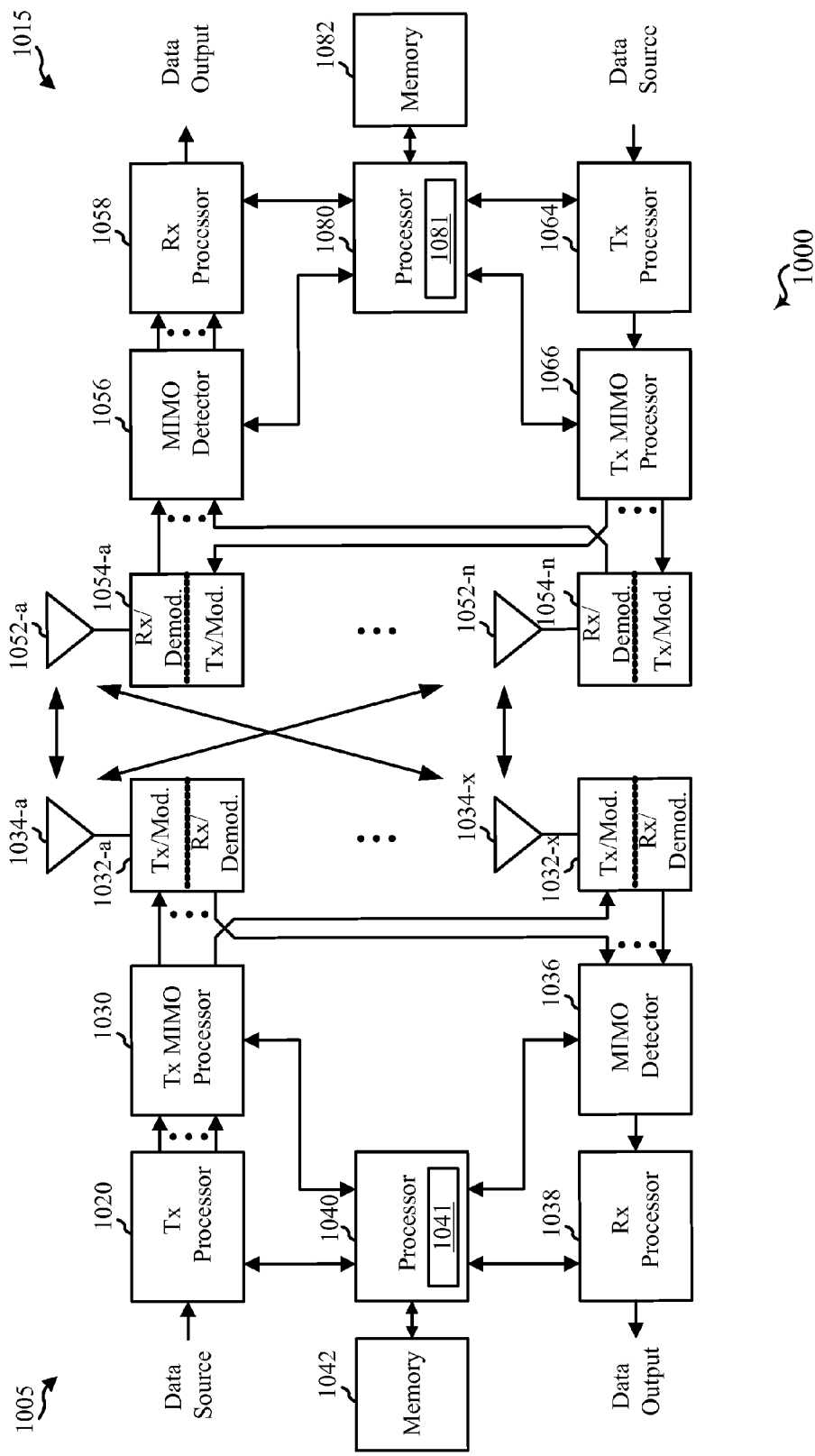
FIG. 10 shows a block diagram that illustrates an example of a multiple-input multiple-output (MIMO) communications system according to various embodiments.

Turning next to FIG. 10, a block diagram of a multiple-input multiple-output (MIMO) communication system 1000 is shown including an eNB 1005 and a UE 1015. The eNB 1005 and the UE 1015 may support LTE-based communications using a licensed and/or unlicensed spectrum. The eNB 1005 may be an example of one or more aspects of the eNBs or devices 105, 205, 705, 755, and/or 805 described with reference to FIGS. 1, 2, 7A, 7B, and/or 8, while the UE 1015 may be an example of one or more aspects of the UEs or devices 115, 215, 705, 755, and/or 915 described with reference to FIGS. 1, 2, 7A, 7B, and/or 9. The system 1000 may illustrate aspects of the wireless communications system 100, and/or 200 described with reference to FIGS. 1 and/or 2, and may perform interfering signal detection according to one or more of various different techniques such as described with reference to FIGS. 2, 3, 4, 5 and/or 6.

The eNB 1005 may be equipped with antennas **1034-*a* through 1034-*x*, and the UE 1015 may be equipped with antennas 1052-*a* through 1052-*n*. In the system 1000, the eNB 1005 may be able to send data over multiple communication links at the same time. Each communication link may be called a "layer" and the "rank" of the communication link may indicate the number of layers used for communication. For example, in a 2×2 MIMO system where eNB 1005 transmits two "layers," the rank of the communication link between the eNB 1005 and the UE 1015** may be two.

At the eNB 1005, a transmit (Tx) processor 1020 may receive data from a data source. The transmit processor 1020 may process the data. The transmit processor 1020 may also generate reference symbols and/or a cell-specific reference signal. A transmit (Tx) MIMO processor 1030 may perform spatial processing (e.g., precoding) on data symbols, control symbols, and/or reference symbols, if applicable, and may provide output symbol streams to the transmit (Tx) modulator/demodulators **1032-*a* through 1032-*x*. Each modulator/demodulators 1032 may process a respective output symbol stream (e.g., for OFDM, etc.) to obtain an output sample stream. Each modulator/demodulators 1032 may further process (e.g., convert to analog, amplify, filter, and upconvert) the output sample stream to obtain a downlink (DL) signal. In one example, DL signals from modulators/demodulators 1032-*a* through 1032-*x* may be transmitted via the antennas 1034-*a* through 1034-*x***, respectively.

At the UE 1015, the antennas **1052-*a* through 1052-*n* may receive the DL signals from the eNB 1005 and may provide the received signals to the receive (Rx) modulator/demodulators 1054-*a* through 1054-*n*, respectively. Each modulator/demodulator 1054 may condition (e.g., filter, amplify, downconvert, and digitize) a respective received signal to obtain input samples. Each modulator/demodulator 1054 may further process the input samples (e.g., for OFDM, etc.) to obtain received symbols. A MIMO detector 1056 may obtain received symbols from all the modulator/demodulators 1054-*a* through 1054-*n*, perform MIMO detection on the received symbols if applicable, and provide detected symbols. A receive (Rx) processor 1058 may process (e.g., demodulate, deinterleave, and decode) the detected symbols, providing decoded data for the UE 1015 to a data output, and provide decoded control information to a processor 1080, or memory 1082. The processor 1080 may include a module or function 1081 that may perform various functions related to using LTE-based communications in a licensed and/or unlicensed spectrum. For example, the module or function 1041 may perform some or all of the functions of the LTE interference detection module 720 or 760 described with reference to FIG. 7A or 7B, and/or of the UE LTE module 940 described with reference to FIG. 9**.

On the uplink (UL), at the UE 1015, a transmit (Tx) processor 1064 may receive and process data from a data source. The transmit processor 1064 may also generate reference symbols for a reference signal. The symbols from the transmit processor 1064 may be precoded by a transmit (Tx) MIMO processor 1066 if applicable, further processed by the transmit (Tx) modulator/demodulators 1054-*a* through 1054-*n* (e.g., for SC-FDMA, etc.), and be transmitted to the eNB 1005 in accordance with the transmission parameters received from the eNB 1005. At the eNB 1005, the UL signals from the UE 1015 may be received by the antennas 1034, processed by the receiver (Rx) modulator/demodulators 1032, detected by a MIMO detector 1036 if applicable, and further processed by a receive (Rx) processor 1038. The receive processor 1038 may provide decoded data to a data output and to the processor 1040. The processor 1040 may include a module or function 1041 that may perform various aspects related to using LTE-based communications in a licensed and/or unlicensed spectrum. For example, the module or function 1041 may perform some or all of the functions of the LTE interference detection module 720 or 760 described with reference to FIG. 7A or 7B, or the eNB LTE module 870 described with reference to FIG. 8. In some embodiments, the module or function 1041 may be used to coordinate null tones and/or reserved resource blocks across a set of eNBs.

The components of the eNB 1005 may, individually or collectively, be implemented with one or more ASICs adapted to perform some or all of the applicable functions in hardware. Each of the noted modules may be a means for performing one or more functions related to operation of the system 1000. Similarly, the components of the UE 1015 may, individually or collectively, be implemented with one or more ASICs adapted to perform some or all of the applicable functions in hardware. Each of the noted components may be a means for performing one or more functions related to operation of the system 1000.

Figure 11:
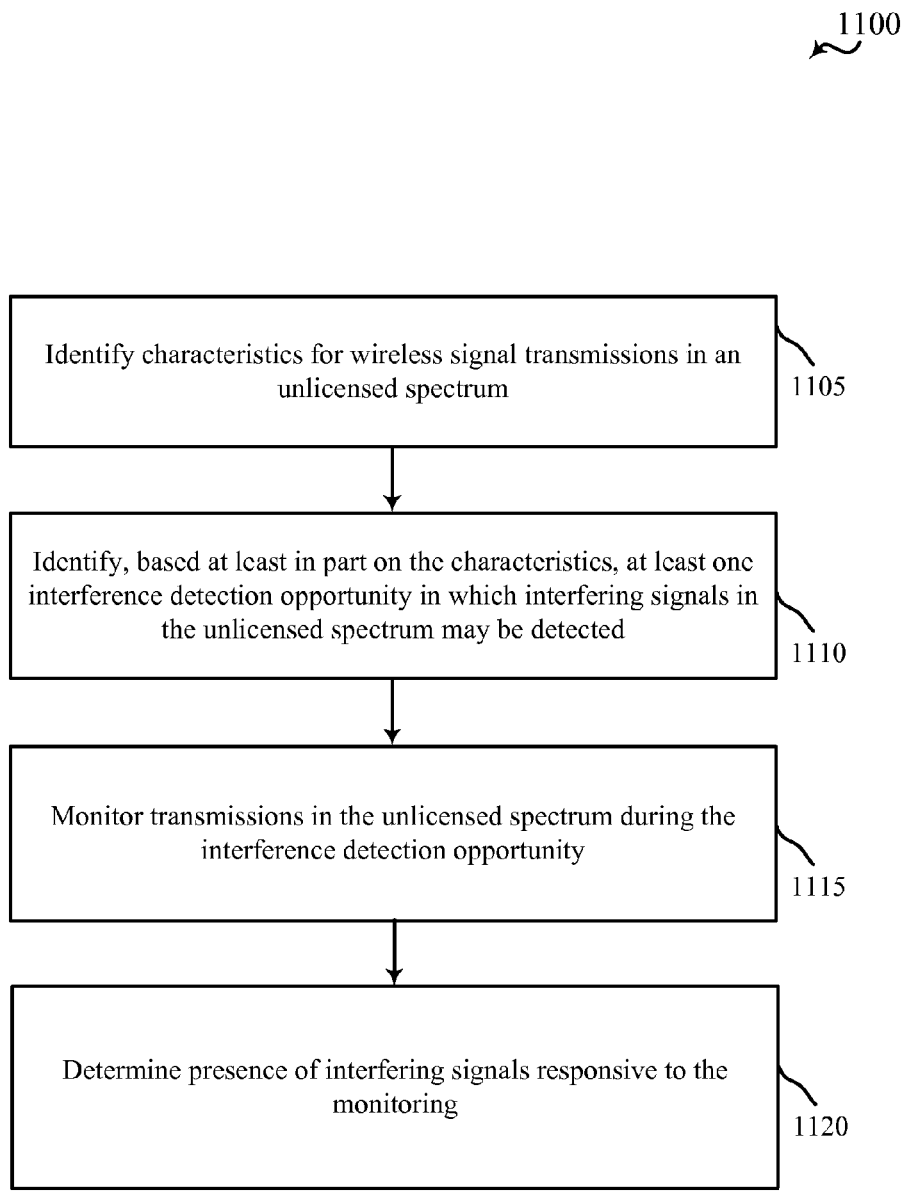
FIGS. 11 and 12 are flowcharts of examples of methods for interfering signal detection based on energy detection according to various embodiments.

FIG. 11 is a flow chart illustrating an example of a method 1100 for wireless communications. The method 1100 may be performed by the UEs or devices 115, 215, 705, 755, 915 and/or 1015 described with reference to FIGS. 1, 2, 7A, 7B, 9, and/or 10. In some embodiments, the method 1100 may be performed by the eNBs or devices 105, 205, 705, 755, 805 and/or 1005 described with reference to FIGS. 1, 2, 7A, 7B, 8, and/or 10. In one embodiment, a UE or eNB may execute one or more sets of codes to control the functional elements of the UE to perform the functions described below.

At block 1105, characteristics for wireless signal transmissions in an unlicensed spectrum are identified. Such characteristics may include, for example, the location of interfering signals in a broadcast spectrum, the presence of interfering signals adjacent to LTE frequency bands, the presence of interfering signals in adjacent frequency bands to LTE frequency bands, and/or the location of null tones and/or reserved resource blocks, for example. The operation(s) at block 1105 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1110, at least one interference detection opportunity is identified, based at least in part on the characteristics, in which interfering signals in the unlicensed spectrum may be detected. The operation(s) at block 1110 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1115, transmissions are monitored in the unlicensed spectrum during the interference detection opportunity. The operation(s) at block 1115 may in some cases be performed using the LTE interference detection module 720 and/or the receiver module 710 described with reference to FIG. 7A, the interference detection module 760, and/or receiver module 712 described with reference to FIG. 7B, the interference detection module 880, the transceiver module 855, and/or the antennas 860 described with reference to FIG. 8, the interference detection module 955, transceiver module 970, and/or the antennas 980 described with reference to FIG. 9, the module or function 1081, the Rx processor 1058, the MIMO detector 1056, the Rx demodulators 1054-*a* through 1054-*n*, and/or the antennas 1052-*a* through 1052-*n* described with reference to FIG. 10, and/or the module or function 1041, the Rx processor 1038, the MIMO detector 1036, the Rx demodulators 1034-*a* through 1034-*n*, and/or the antennas 1034-*a* through 1034-*n* described with reference to FIG. 10.

At block 1120, the presence of interfering signals is determined responsive to the monitoring. The operation(s) at block 1120 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

Thus, the method 1100 may provide for wireless communications in which interfering signals may be detected. It should be noted that the method 1100 is just one implementation and that the operations of the method 1100 may be rearranged or otherwise modified such that other implementations are possible.

Figure 12:
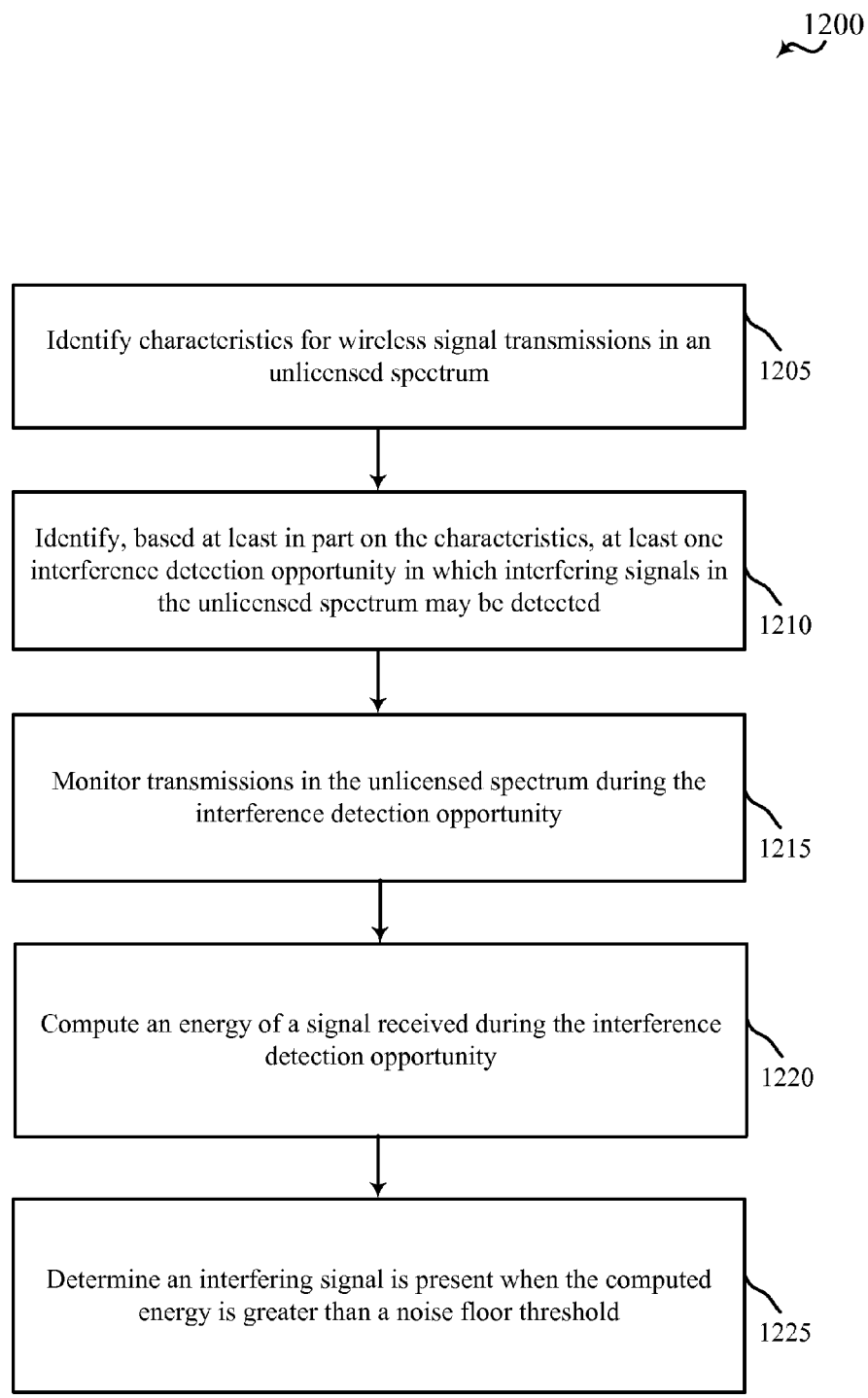

FIG. 12 is a flow chart illustrating an example of a method 1200 for wireless communications. The method 1200 may be performed by the UEs or devices 125, 215, 705, 755, 915 and/or 1015 described with reference to FIGS. 1, 2, 7A, 7B, 9, and/or 10. In some embodiments, the method 1200 may be performed by the eNBs or devices 105, 205, 705, 755, 805 and/or 1005 described with reference to FIGS. 1, 2, 7A, 7B, 8, and/or 10. In one embodiment, a UE or eNB may execute one or more sets of codes to control the functional elements of the UE to perform the functions described below.

At block 1205, characteristics for wireless signal transmissions in an unlicensed spectrum are identified. Such characteristics may include, for example, the location of interfering signals in a broadcast spectrum, the presence of interfering signals adjacent to LTE frequency bands, the presence of interfering signals in adjacent frequency bands to LTE frequency bands, and/or the location of null tones and/or reserved resource blocks, for example. The operation(s) at block 1205 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1210, at least one interference detection opportunity is identified, based at least in part on the characteristics, in which interfering signals in the unlicensed spectrum may be detected. The operation(s) at block 1210 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1215, transmissions are monitored in the unlicensed spectrum during the interference detection opportunity. The operation(s) at block 1215 may in some cases be performed using the LTE interference detection module 720 and/or the receiver module 710 described with reference to FIG. 7A, the interference detection module 760, and/or receiver module 712 described with reference to FIG. 7B, the interference detection module 880, the transceiver module 855, and/or the antennas 860 described with reference to FIG. 8, the interference detection module 955, transceiver module 970, and/or the antennas 980 described with reference to FIG. 9, the module or function 1081, the Rx processor 1058, the MIMO detector 1056, the Rx demodulators 1054-*a* through 1054-*n*, and/or the antennas 1052-*a* through 1052-*n* described with reference to FIG. 10, and/or the module or function 1041, the Rx processor 1038, the MIMO detector 1036, the Rx demodulators 1034-*a* through 1034-*n*, and/or the antennas 1034-*a* through 1034-*n* described with reference to FIG. 10.

At block 1220, an energy of a received signal that is received during the interference detection opportunity is computed. The operation(s) at block 1220 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1225, an interfering signal is determined to be present when the computed energy is greater than a noise floor threshold. The operation(s) at block 1225 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

Thus, the method 1200 may provide for wireless communications in which interfering signals may be detected. It should be noted that the method 1200 is just one implementation and that the operations of the method 1200 may be rearranged or otherwise modified such that other implementations are possible.

Figure 13:
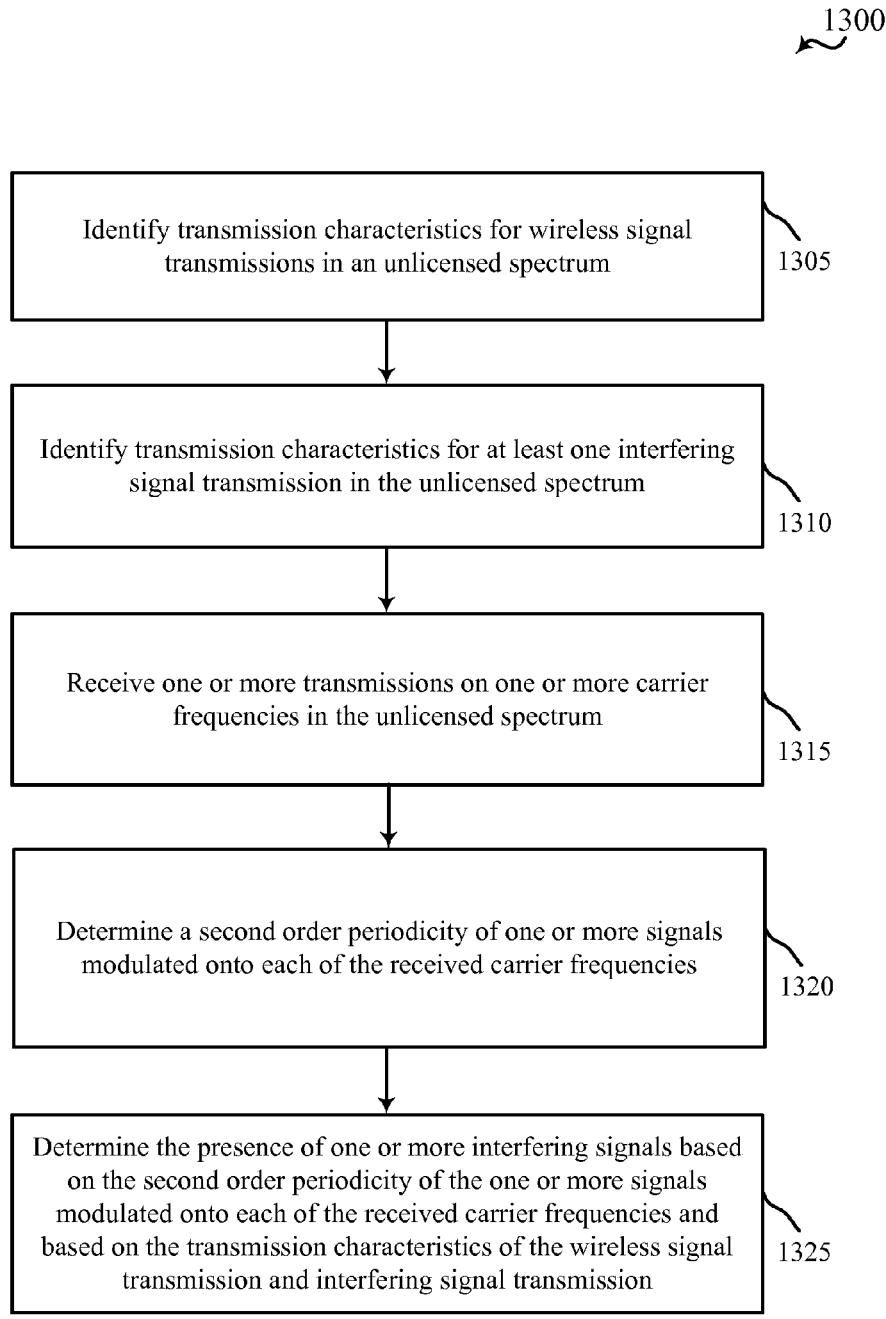
FIGS. 13 and 14 are flowcharts of examples of methods for interfering signal detection based on signal characteristics of different signals according to various embodiments.

FIG. 13 is a flow chart illustrating an example of a method 1300 for wireless communications. The method 1300 may be performed by the UEs or devices 135, 215, 705, 755, 915 and/or 1015 described with reference to FIGS. 1, 2, 7A, 7B, 9, and/or 10. In some embodiments, the method 1300 may be performed by the eNBs or devices 105, 205, 705, 755, 805 and/or 1005 described with reference to FIGS. 1, 2, 7A, 7B, 8, and/or 10. In one embodiment, a UE or eNB may execute one or more sets of codes to control the functional elements of the UE to perform the functions described below.

At block 1305, characteristics for wireless signal transmissions in an unlicensed spectrum are identified. Such characteristics may include, for example, second order periodicity for an LTE/LTE-A signal in an unlicensed or shared spectrum. The operation(s) at block 1305 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1310, transmission characteristics are identified for at least one interfering signal transmission in the unlicensed spectrum. Such characteristics may include, for example, second order periodicity for an interfering signal, such as a WiFi signal. The operation(s) at block 1310 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1315, one or more transmissions are received on one or more carrier frequencies in the unlicensed spectrum. The operation(s) at block 1315 may in some cases be performed using the LTE interference detection module 720 and/or the receiver module 710 described with reference to FIG. 7A, the interference detection module 760, and/or receiver module 712 described with reference to FIG. 7B, the interference detection module 880, the transceiver module 855, and/or the antennas 860 described with reference to FIG. 8, the interference detection module 955, transceiver module 970, and/or the antennas 980 described with reference to FIG. 9, the module or function 1081, the Rx processor 1058, the MIMO detector 1056, the Rx demodulators 1054-*a* through 1054-*n*, and/or the antennas 1052-*a* through 1052-*n* described with reference to FIG. 10, and/or the module or function 1041, the Rx processor 1038, the MIMO detector 1036, the Rx demodulators 1034-*a* through 1034-*n*, and/or the antennas 1034-*a* through 1034-*n* described with reference to FIG. 10.

At block 1320, a second order periodicity of one or more signals modulated onto each of the received carrier frequencies is determined. The operation(s) at block 1320 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1325, the presence of one or more interfering signals is determined based on the second order periodicity of the one or more signals modulated onto each of the received carrier frequencies and based on the transmission characteristics of the wireless signal transmission and interfering signal transmission. The operation(s) at block 1325 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

Thus, the method 1300 may provide for wireless communications in which interfering signals may be detected. It should be noted that the method 1300 is just one implementation and that the operations of the method 1300 may be rearranged or otherwise modified such that other implementations are possible.

Figure 14:
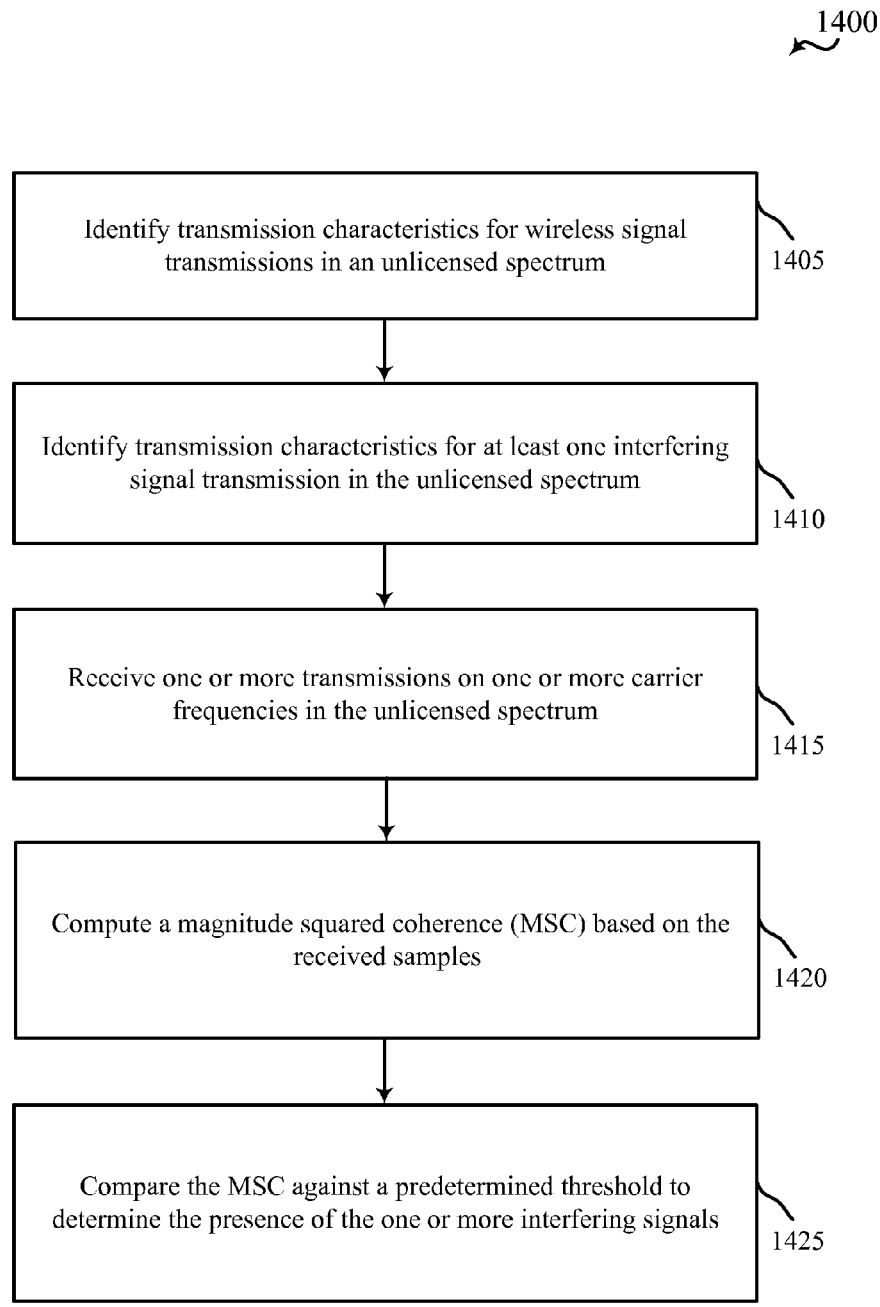

FIG. 14 is a flow chart illustrating an example of a method 1400 for wireless communications. The method 1400 may be performed by the UEs or devices 145, 215, 705, 755, 915 and/or 1015 described with reference to FIGS. 1, 2, 7A, 7B, 9, and/or 10. In some embodiments, the method 1400 may be performed by the eNBs or devices 105, 205, 705, 755, 805 and/or 1005 described with reference to FIGS. 1, 2, 7A, 7B, 8, and/or 10. In one embodiment, a UE or eNB may execute one or more sets of codes to control the functional elements of the UE to perform the functions described below.

At block 1405, characteristics for wireless signal transmissions in an unlicensed spectrum are identified. Such characteristics may include, for example, second order periodicity for an LTE/LTE-A signal in an unlicensed or shared spectrum. The operation(s) at block 1405 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1410, transmission characteristics are identified for at least one interfering signal transmission in the unlicensed spectrum. Such characteristics may include, for example, second order periodicity for an interfering signal, such as a WiFi signal. The operation(s) at block 1410 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1415, one or more transmissions are received on one or more carrier frequencies in the unlicensed spectrum. The operation(s) at block 1415 may in some cases be performed using the LTE interference detection module 720 and/or the receiver module 710 described with reference to FIG. 7A, the interference detection module 760, and/or receiver module 712 described with reference to FIG. 7B, the interference detection module 880, the transceiver module 855, and/or the antennas 860 described with reference to FIG. 8, the interference detection module 955, transceiver module 970, and/or the antennas 980 described with reference to FIG. 9, the module or function 1081, the Rx processor 1058, the MIMO detector 1056, the Rx demodulators 1054-a through 1054-n, and/or the antennas 1052-a through 1052-n described with reference to FIG. 10, and/or the module or function 1041, the Rx processor 1038, the MIMO detector 1036, the Rx demodulators 1034-a through 1034-n, and/or the antennas 1034-a through 1034-n described with reference to FIG. 10.

At block 1420, a magnitude squared coherence (MSC) based on the received samples is computed, based on, for example one or more samples of second order periodicity of the received transmissions. The operation(s) at block 1420 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

At block 1425, the MSC is compared against a predetermined threshold to determine the presence of the one or more interfering signals. The operation(s) at block 1425 may in some cases be performed using the LTE interference detection module 720 described with reference to FIG. 7A, the interference detection module 760 described with reference to FIG. 7B, the interference detection module 880 described with reference to FIG. 8, the interference detection module 955 described with reference to FIG. 9, and/or the module or function 1081 or 1041 described with reference to FIG. 10.

Thus, the method 1400 may provide for wireless communications in which interfering signals may be detected. It should be noted that the method 1400 is just one implementation and that the operations of the method 1400 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, the method comprising:
   identifying frequency characteristics of wireless signal transmissions in an unlicensed spectrum;
   identifying, based at least in part on the frequency characteristics, an interference detection opportunity in the unlicensed spectrum, the interference detection opportunity comprising a time and frequency identified as having an absence of a wireless signal transmission associated with a specific radio access technology (RAT);
   monitoring transmissions in the unlicensed spectrum based at least in part on the interference detection opportunity;
   determining a presence of interfering signals responsive to the monitoring; and
   mitigating interference based on the determination.

2. The method of claim 1, wherein the wireless signal transmission comprises a Long Term Evolution (LTE) signal transmission in the unlicensed spectrum.

3. The method of claim 1, wherein the interference detection opportunity comprises at least one frequency band adjacent to an LTE signal transmission frequency band.

4. The method of claim 1, wherein the interference detection opportunity comprises one or more of reserved null tones or reserved empty resource blocks (RBs) within an LTE signal transmission in the unlicensed spectrum.

5. The method of claim 4, further comprising signaling a location of the one or more reserved null tones or reserved empty RBs through one or more of radio resource control (RRC) signaling, system information block (SIB) signaling, media access control (MAC) control elements, or a downlink grant readable by at least one user equipment.

6. The method of claim 1, further comprising:
   reserving one or more null RBs adjacent to the wireless signal transmission; and
   transmitting the one or more reserved null RBs adjacent to the wireless signal transmission.

7. The method of claim 1, wherein the determining comprises:
   computing an energy of a signal received during the interference detection opportunity; and
   determining an interfering signal is present when the computed energy is greater than a noise floor threshold.

8. The method of claim 7, wherein the interference detection opportunity comprises two or more reserved null tones during the wireless signal transmission in the unlicensed spectrum, and wherein computing the energy of the signal received comprises computing an average energy of signals received during the interference detection opportunity.

9. The method of claim 1, wherein the frequency characteristics of the wireless signal transmissions comprise an LTE signal second order periodicity and an interfering signal second order periodicity.

10. The method of claim 9, wherein the LTE signal second order periodicity is 66.7 microseconds and the interfering signal second order periodicity is 3.2 microseconds.

11. The method of claim 1, wherein monitoring transmissions in the unlicensed spectrum comprises:
    receiving one or more transmissions on one or more carrier frequencies in the unlicensed spectrum; and
    determining a second order periodicity of one or more signals modulated onto each of the received carrier frequencies.

12. The method of claim 11, wherein determining the presence of interfering signals is based on the second order periodicity of the one or more signals modulated onto each of the received carrier frequencies and based on the frequency characteristics of the wireless signal transmission and an interfering signal transmission.

13. The method of claim 11, wherein determining the presence of interfering signals comprises determining whether the received carrier frequencies exhibit both an LTE second order periodicity and an interfering signal second order periodicity.

14. The method of claim 11, wherein determining the presence of the interfering signals comprises determining whether the received carrier frequencies exhibit a second order periodicity different than a LTE signal second order periodicity in the unlicensed spectrum.

15. An apparatus for wireless communications, comprising:
   a processor; and
   memory coupled to the processor;
   wherein the processor is configured to:
   identify frequency characteristics of wireless signal transmissions in an unlicensed spectrum;
   identify, based at least in part on the frequency characteristics, an interference detection opportunity in the unlicensed spectrum, the interference detection opportunity comprising a time and frequency identified as having an absence of a wireless signal transmission associated with a specific radio access technology (RAT);
   monitor transmissions in the unlicensed spectrum based at least in part on the interference detection opportunity; and
   determine presence of interfering signals responsive to the monitoring.

16. The apparatus of claim 15, wherein the wireless signal transmission a Long Term Evolution (LTE) signal transmission in the unlicensed spectrum.

17. The apparatus of claim 15, wherein the interference detection opportunity comprises at least one frequency band adjacent to an LTE signal transmission frequency band.

18. The apparatus of claim 15, wherein the interference detection opportunity comprises one or more of reserved null tones or reserved empty resource blocks (RBs) within an LTE signal transmission in the unlicensed spectrum.

19. The apparatus of claim 18, wherein the processor is further configured to signal a location of the one or more reserved null tones or reserved empty RBs through one or more of radio resource control (RRC) signaling, system information block (SIB) signaling, media access control (MAC) control elements or a downlink grant readable by at least one user equipment.

20. The apparatus of claim 15, wherein the processor is further configured to:
   reserve one or more null RBs adjacent to the wireless signal transmission; and
   transmit the one or more reserved null RBs adjacent to the wireless signal transmission.

21. The apparatus of claim 15, wherein the processor is further configured to:
   compute an energy of a signal received during the interference detection opportunity; and
   determine an interfering signal is present when the computed energy is greater than a noise floor threshold.

22. The apparatus of claim 15, wherein the frequency characteristics of the wireless signal transmissions comprise an LTE signal second order periodicity and an interfering signal second order periodicity.

23. The apparatus of claim 22, wherein the LTE signal second order periodicity is 66.7 microseconds and the interfering signal second order periodicity is 3.2 microseconds.

24. The apparatus of claim 15, wherein monitoring transmissions in the unlicensed spectrum comprises:
   receiving one or more transmissions on one or more carrier frequencies in the unlicensed spectrum; and
   determining a second order periodicity of one or more signals modulated onto each of the received carrier frequencies.

25. The apparatus of claim 24, wherein determining the presence of interfering signals is based on the second order periodicity of the one or more signals modulated onto each of the received carrier frequencies and based on the frequency characteristics of the wireless signal transmission and an interfering signal transmission.

26. The apparatus of claim 24, wherein determining the presence of interfering signals comprises determining whether the received carrier frequencies exhibit both an LTE second order periodicity and an interfering signal second order periodicity.

27. An apparatus for wireless communications, comprising:
   means for identifying frequency characteristics of wireless signal transmissions in an unlicensed spectrum;
   means for identifying, based at least in part on the frequency characteristics, an interference detection opportunity in the unlicensed spectrum, the interference detection opportunity comprising a time and frequency identified as having an absence of a wireless signal transmission associated with a specific radio access technology (RAT);
   means for monitoring transmissions in the unlicensed spectrum based at least in part on the interference detection opportunity; and
   means for determining presence of interfering signals responsive to the monitoring.

28. The apparatus of claim 27, wherein the frequency characteristics of the wireless signal transmissions comprise an LTE signal second order periodicity and an interfering signal second order periodicity.

29. The apparatus of claim 27, wherein means for monitoring transmissions in the unlicensed spectrum comprises:
   means for receiving one or more transmissions on one or more carrier frequencies in the unlicensed spectrum; and
   means for determining a second order periodicity of one or more signals modulated onto each of the received carrier frequencies.

30. A non-transitory computer-readable medium storing instructions executable by a processor, comprising:
   instructions to identify frequency characteristics of wireless signal transmissions in an unlicensed spectrum;
   instructions to identify, based at least in part on the frequency characteristics, an interference detection opportunity in the unlicensed spectrum, the interference detection opportunity comprising a time and frequency identified as having an absence of a wireless signal transmission associated with a specific radio access technology (RAT);
   instructions to monitor transmissions in the unlicensed spectrum based at least in part on the interference detection opportunity; and
   instructions to determine presence of interfering signals responsive to the monitoring.

* * * * *